(12) United States Patent
Dailey et al.

(10) Patent No.: US 11,729,447 B2
(45) Date of Patent: *Aug. 15, 2023

(54) METHODS AND APPARATUS TO DETERMINE A UNIQUE AUDIENCE FOR INTERNET-BASED MEDIA

(71) Applicant: The Nielsen Company (US), LLC, New York, NY (US)

(72) Inventors: Jake Dailey, San Francisco, CA (US); Furqan Hanif, Tampa, FL (US); Diane Morovati Lopez, West Hills, CA (US); Jose Mortensen, Tampa, FL (US); Chris Nicotra, Holiday, FL (US); Christine Pierce, Palm Harbor, FL (US); Matthew Vanlandeghem, Chicago, IL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/856,819

(22) Filed: Jul. 1, 2022

(65) Prior Publication Data
US 2023/0029381 A1 Jan. 26, 2023

Related U.S. Application Data

(63) Continuation of application No. 17/337,135, filed on Jun. 2, 2021, now Pat. No. 11,381,859, which is a (Continued)

(51) Int. Cl.
*H04N 21/258* (2011.01)
*H04N 21/266* (2011.01)
(Continued)

(52) U.S. Cl.
CPC ..... *H04N 21/25866* (2013.01); *G06F 3/0641* (2013.01); *G06F 16/137* (2019.01);
(Continued)

(58) Field of Classification Search
CPC ......... H04N 21/25866; H04N 21/2351; H04N 21/25435; H04N 21/26613; H04N 21/812;
(Continued)

(56) References Cited

U.S. PATENT DOCUMENTS 6,108,637 A 8/2000 Blumenau
8,370,489 B2 2/2013 Mazumdar et al.
(Continued)

OTHER PUBLICATIONS

Flajolet et al., "HyperLogLog: the analysis of a near-optimal cardinality estimation algorithm", 2007 Conference on Analysis of Algorithms, DMTCS proc. AH, 2007, pp. 127-146.
(Continued)

*Primary Examiner* — Alazar Tilahun

(57) ABSTRACT

Methods, apparatus, systems and articles of manufacture are disclosed to generate measures of unique audiences for Internet-based media. An example apparatus disclosed herein includes at least one memory, instructions, and at least one processor. The processor to execute the instructions to: receive first HyperLogLog (HLL) data from a first server of a first database proprietor and second HyperLogLog (HLL) data from a second server of a second database proprietor, the first HLL data including obfuscated first user impression data and the second HLL data including obfuscated second user impression data; generate union HLL data based on the first HLL data from the first database proprietor and the second HLL data from the second database proprietor by performing a union of data sets of the obfuscated first user impression data represented in the first HLL data and the obfuscated second user impression data represented in (Continued)

the second HLL data; and determine a total number of deduplicated unique audience members based on the union HLL data generated by the vector analyzer.

20 Claims, 11 Drawing Sheets

Related U.S. Application Data continuation of application No. 16/520,100, filed on Jul. 23, 2019, now Pat. No. 11,039,190.

(60) Provisional application No. 62/702,734, filed on Jul. 24, 2018.

(51) Int. Cl.
    *H04N 21/81*     (2011.01)
    *H04N 21/2543*     (2011.01)
    *H04N 21/235*     (2011.01)
    *G06F 16/22*     (2019.01)
    *G06F 16/13*     (2019.01)
    *G06F 3/06*     (2006.01)

(52) U.S. Cl.
    CPC ..... *G06F 16/2255* (2019.01); *H04N 21/2351* (2013.01); *H04N 21/25435* (2013.01); *H04N 21/26613* (2013.01); *H04N 21/812* (2013.01)

(58) Field of Classification Search
    CPC .......................... H04N 21/222; H04N 21/2407; G06F 3/0641; G06F 16/137; G06F 16/2255; G06F 3/167; G06F 16/955
    See application file for complete search history.

(56) References Cited

U.S. PATENT DOCUMENTS

| | | | |
|---|---|---|---|
| 10,205,994 B2* | 2/2019 | Splaine | H04L 67/53 |
| 10,579,827 B2* | 3/2020 | Telford | G06F 21/6254 |
| 11,039,190 B1 | 6/2021 | Dailey et al. | |
| 2013/0145022 A1 | 6/2013 | Srivastava et al. | |
| 2015/0046579 A1* | 2/2015 | Perez | H04L 67/02 |
| | | | 709/224 |
| 2015/0178769 A1* | 6/2015 | Mirisola | G06Q 30/0246 |
| | | | 705/14.45 |
| 2015/0186403 A1* | 7/2015 | Srivastava | H04N 21/44226 |
| | | | 707/692 |
| 2018/0246649 A1* | 8/2018 | Datar | H03M 7/3091 |
| 2018/0349933 A1* | 12/2018 | Modarresi | G06Q 30/0204 |

OTHER PUBLICATIONS

United States Patent and Trademark Office, "Notice of Allowance and Fee(s) Due," issued in connection with U.S. Appl. No. 16/520,100 dated Feb. 10, 2021, 8 pages.

United States Patent and Trademark Office, "Non-Final Office Action", issued in connection with U.S. Appl. No. 17/337,135 dated Oct. 28, 2021, 6 pages.

United States Patent and Trademark Office, "Notice of Allowance and Fee(s) Due," issued in connection with U.S. Appl. No. 17/337,135 dated Mar. 1, 2022, 8 pages.

* cited by examiner

METHODS AND APPARATUS TO DETERMINE A UNIQUE AUDIENCE FOR INTERNET-BASED MEDIA

RELATED APPLICATIONS

This patent arises from a continuation of U.S. patent application Ser. No. 17/337,135, filed on Jun. 2, 2021, which is a continuation of U.S. patent application Ser. No. 16/520,100, filed on Jul. 23, 2019, which claims priority to, and the benefit of, U.S. Provisional patent application Ser. No. 62/702,734, filed on Jul. 24, 2019. U.S. patent application Ser. No. 17/337,135, U.S. patent application Ser. No. 16/520,100 and U.S. Provisional patent application Ser. No. 62/702,734 are hereby incorporated herein by reference in their entireties.

FIELD OF THE DISCLOSURE

This disclosure relates generally to computing systems, and, more particularly, to computing systems to generate measures of unique audiences for Internet-based media.

BACKGROUND

In recent years, media devices have been provided with Internet connectivity and the ability to retrieve media from the Internet. As such, media exposure has shifted away from conventional methods of presentation, such as broadcast television, towards presentation via consumer devices accessing media via the Internet.

Media providers and/or other entities such as, for example, advertising companies, broadcast networks, etc. are often interested in the viewing, listening, and/or media behavior of audience members and/or the public in general. The media usage and/or exposure habits of monitored audience members, as well as demographic data about the audience members, are collected and used to statistically determine the size and demographics of an audience of interest.

Traditionally, audience measurement entities determine audience engagement levels for media programming and/or advertisements based on registered panel members. That is, an audience measurement entity enrolls people who consent to being monitored into a panel. The audience measurement entity then monitors those panel members to collect media measurement data identifying media (e.g., television programs, radio programs, movies, DVDs, etc.) presented to those panel members. In this manner, the audience measurement entity can determine exposure measures for different media (e.g., content and/or advertisements) based on the collected media measurement data.

Figure 1:
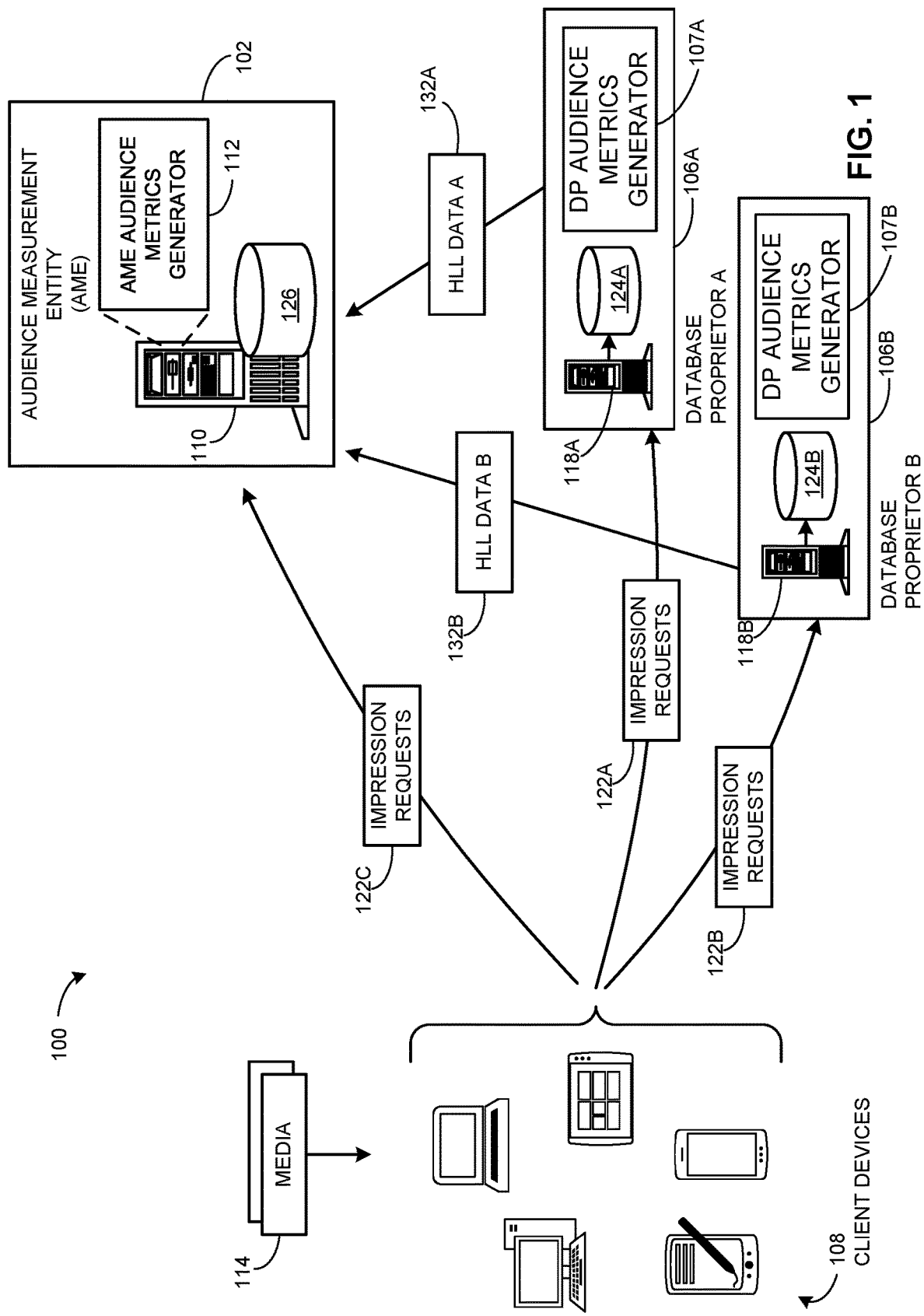
FIG. 1 is a block diagram of an example environment in which the teachings of this disclosure may be implemented.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Techniques for monitoring user access to an Internet-accessible media, such as digital television (DTV) media and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions (also known as a media impression request) are associated with the hypertext markup language (HTML) of the media to be tracked. When a client requests the media, both the media and the impression request are downloaded to the client. The impression requests are, thus, executed whenever the media is accessed, be it from a server or from a cache.

Impression requests cause monitoring data reflecting information about an access to the media to be sent from the client that downloaded the media to a monitoring entity via a cookie. Sending the monitoring data from the client to the monitoring entity is known as an impression request. Typically, the monitoring entity is an audience measurement entity (AME) that did not provide the media to the client and who is a trusted (e.g., neutral) third party for providing accurate usage statistics (e.g., The Nielsen Company, LLC).

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietor to recognize their subscribers when they visit their web site.

The protocols of the Internet make cookies inaccessible outside of the domain (e.g., Internet domain, domain name, etc.) on which they were set. Thus, a cookie set in, for example, the facebook.com domain is accessible to servers in the facebook.com domain, but not to servers outside that domain. Therefore, although an AME might find it advantageous to access the cookies set by the database proprietors, they are unable to do so.

The inventions disclosed in Mainak et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mainak et al. accomplish this task by structuring the AME to respond to impression requests from clients (who may not be a member of an audience member panel and, thus, may be unknown to the audience member entity) by redirecting the clients from the AME to a database proprietor, such as a social network site partnered with the audience member entity, using an impression response. Such a redirection initiates a communication session between the client accessing the tagged media and the database proprietor. For example, the impression response received from the AME may cause the client to send a second impression request to the database proprietor. In response to receiving this impression request, the database proprietor (e.g., Facebook) can access any cookie it has set on the client to thereby identify the client based on the internal records of the database proprietor. In the event the client corresponds to a subscriber of the database proprietor, the database proprietor logs/records a database proprietor demographic impression in association with the client/user.

As used herein, an impression is defined to be an event in which a home and individual access and is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or television may be exposed to the same media via multiple devices (e.g., two or more of a mobile device, a tablet, a laptop, etc.) and/or via multiple media types (e.g., digital media available online, digital TV (DTV) media temporality available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a census measurement science (CMS) tag executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is used to adjust cross-platform media exposure totals so that a single audience member is not counted multiple times for multiple exposures to the same media delivered/accessed via different media-delivery platforms.

As used herein, a unique audience (e.g., a unique audience size, deduplicated audience size, or audience size) is based on audience members distinguishable from one another. That is, a particular audience member exposed to particular media is measured as a single unique audience member regardless of how many times that audience member is exposed to that particular media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

An AME may want to find unique audience/deduplicate impressions across multiple database proprietors (DPs), custom date ranges, custom combinations of assets and platforms, etc. Some deduplication techniques used by an AME perform deduplication across DPs using additional systems (e.g., Audience Link, etc.). For example, such deduplication techniques match or probabilistically link personally identifiable information (PII) from each source. Such deduplication techniques require storing or exporting massive amounts of user data, using approximations instead of direct measurement, or calculating audience overlap for all possible combinations, neither of which are desirable. PII data can be used to represent and/or access audience demographics (e.g., geographic locations, ages, genders, etc.)

Examples disclosed herein perform a HyperLogLog (HLL) deduplication technique to perform dynamic deduplication. HLL allows an AME to obtain the non-PII HLL outputs from various DPs, thereby allowing deduplication to be performed (a) on-the-fly, (b) using a fraction of the storage/computation of conventional deduplication techniques, (c) without sacrificing user or client privacy, and (d) using any number of data sources or assets. Examples disclosed herein dynamically duplicate across many data sources to allow an AME to improve non-coverage, kids' measurement, and expanded demographics. The AME can improve non-coverage by combining multiple data sources so that the likelihood a person is not covered by an AME measurement is decreased and overlap between providers (e.g., database proprietors) can be seen. The AME can improve kids' measurement by, if data sources with high kids' coverage and useful PII fields for matching are identified, confirming kids' measurement by multiple database proprietors. The AME can improve expanded demographics when database proprietors with more specific demographic data are incorporated through direct matching and comparison with other database proprietors.

HLL is an algorithm for estimating unique counts. An HLL process includes sorting hashed values of data into a plurality of bins (e.g., m bins) of HLL data. To form the HLL data hash values are assigned to bins based on a shared chunk or a shared number of bits (e.g., leading bits, or a number of most significant bits (MSBs)) across multiple hash values. The shared number of bits define an address (e.g., identical values get assigned to the same bin) of a corresponding bin in the HLL data. Multiple bins in the HLL data are defined by corresponding leading bits of the hash values. More bins in the HLL data correspond to more granularity, less noisy estimates, and more computer memory usage. Each hash value is used to update a bin's estimate of the overall unique audience member count represented by that bin of the HLL data. In this manner, the estimate of a unique audience size is also based on the hash values themselves. When a database proprietor receives the HLL data structure from each DP, the database proprietary can combine the multiple data structures into a single data structure, which will allow to compute an estimate for the union of all the DP audiences based on a modified average of the audience size estimate resulting therefrom. More specifically, the AME can combine the data structures from each DP by computing a new HLL data structure where only the hash information corresponding to the largest estimate saved. In this manner, the AME uses the union to determine union HLL data based on the maximum uniqueness values between the bins of the HLL data sets. The AME then determines a normalized harmonic mean across all bins' estimates of the union HLL data set to calculate a final estimate of the overall unique audience member count.

Example HLL-based techniques disclosed herein may be used to count the number of unique items in a data stream (e.g., the number of unique panelist IDs, the number of database proprietor subscriber user IDs, etc. to determine unique audience counts or unique audience sizes). Some conventional methods to count unique items (e.g., unique audience members) include tracking each new value while reading through data and counting the number of unique values. However, such conventional techniques require a lot of computer memory to store the unique items. Additionally, previous unique counts (e.g., for unique audience members) cannot be reused when new impression data is received. Accordingly, new impression data requires recounting. Example HLL-based techniques disclosed herein may be used to directly address the limitations of such conventional techniques.

In some examples disclosed herein, HLL-based techniques can be used to deduplicate audience member data sets. For example, examples disclosed herein may perform deduplication using HLL "Building-Blocks." An AME can create HLL building-blocks by using a common PII input type and/or format across all DPs, assets, date ranges, etc. to create hash values by hashing PII input data (e.g., email addresses, phone numbers, a common concatenation of other PII information such as Name and Zip and Email, etc.). Using a common PII input type and/or format across all DPs, assets, data ranges, etc. to hash ensures values will be binned together correctly in corresponding bias (e.g., for different demographics, for PII, etc.). For example, a plurality of HLL bins (e.g., m HLL bins) may be created at the most granular level to be measured (e.g., m bins for each site, day, demographic buckets, etc.).

In examples disclosed herein, a salt may be used to improve the privacy protections of the PII input data. In this manner, examples disclosed herein, use a salt to generate hash values of input PII data at a database proprietor to substantially reduce or eliminate the likelihood of an intermediary third party from revealing or discovering the underlying input PII data corresponding to the hash values, which results from the reliance of the HLL data set on individual hash values to compute the HLL data structure. As used herein, a salt is random data (e.g., an arbitrary data, etc.) used by a hashing algorithm (e.g., an HLL algorithm, etc.). In some examples, a salt can be generated using pseudo-random inputs. In some examples, a generated salt can be concatenated with the data (e.g., demographic information, PII data, etc.) to be hashed. In such examples, when the concatenated string is hashed, the resulting hash value is varied based on the salt used. Accordingly, the underlying data is concealed by the salt. In such examples, the salt and hash value are stored in a hashing database. In some examples, the salt can be reused as needed. In other examples, a new salt can be generated for each instance of data to be hashed.

HLL processes may lead to deduplication errors that the AME may need to mitigate. For example, a deduplication error may stem from the granularity of the bins. For example, fewer/larger bins produce higher variance unique estimates than smaller ones. In such examples, the AME must determine the m number of bins that correspond to an amount of acceptable error. In another example, a deduplication error may stem from the choice of the PII input (e.g., for multi-DP deduplication). DPs may have mismatched inputs for the same person or low coverage for a particular PII field. For example, if a chosen PII field is an email address and one person has different email addresses for two DPs, the person may be double-counted. In another example, if a DP (e.g., Facebook) only has email addresses of subscribers for 70% of logged impressions, and only 70% of people have Facebook, the additional non-coverage (e.g., for logged impressions corresponding to people not recognized by Facebook) may need to be corrected.

In some examples, HLL may be limited by an ability to match PII. In some example, an AME may overcome such limitation by supplementing the PII data with Audience Link (AL) panel data which includes PII data of panelists enrolled into an AL panel maintained by the AME. When a person enrolls in the AL panel, the person, or panelist, agrees to provide access to their PII by the AME for audience metrics. In some examples, when all PII fields of AL panel data of the AME matches all fields of PII data of a DP, the AL panel data and the HLL data can be made equivalent. For example, if m is set to a number of AL panelists and fields of AL panelist PII data for those AL panelists match fields of PII data of the DP PII data, then the AL panelist can be set to the HLL data. In some examples, it may be rare for PII to be matching for all fields. In such cases, AL may use machine learning to predict, given two sets of PII inputs, the probability of a match. When HLL does not have PII from all DPs directly available to compare, compression methods may be trained (if applicable), tested, and deployed using a one-sided dataset. Without compression, using more fields makes matching harder. Yet, using more fields increases our confidence in a true match, corresponding to fewer other adjustments, as further described below.

Some examples disclosed herein mitigate PII input error. An AME may correct PII input error using several approaches. One approach is to create robust PII inputs. Relying on one field of PII to produce the same hashed value across all DPs is susceptible to error. A concatenation of several fields may be more robust. For example, Jake_Dailey_jd123@nlsn.com_94129 has more in common with Jake_Dailey_goblue123@gmail.com_94129 than email alone (e.g., jd123@nlsn.com and goblue123@gmail.com) because first and last names are prepended to the email addresses and a zip code is appended to the email addresses. A lossy compression algorithm can capture the most relevant aspects of this string. For example, locality-sensitive hashing may create a compressed representation with the most significant prices of input and use this to determine similarity. Siamese Neural Networks are desired to learn a matching compressed representation for similar but different inputs.

A second approach to mitigating PII input error corresponds to non-coverage adjustment using DP and AME data. Each PII field's coverage is likely skewed toward a non-representative subset of the population. Unlike overall DP non-coverage (which an AME adjusts for using panel and survey data), coverage error for PII inputs can be measured directly using the demographic data they already have, which may be supplemented with AME panel data, where possible. If an AME and DP can measure this skew, this subset can be reweighted using the observed non-coverage rate.

A third approach to mitigating PII input error corresponds to PII field-specific corrections based on survey and panel inputs. Each PII field has its own errors associated with it. For example, a person may use multiple emails across different DP websites. Alternatively, multiple people may share the same phone number used across websites. In some examples, an AME has panel data on some input fields and may conduct surveys to account for misattribution or over-estimation resulting from a specific choice of PII field. This methodology may follow a model of an AME's digital adjustment factor methodology. In some examples, the three above-approaches may be combined to mitigate error with the fewest assumptions.

Assuming a set, S, of non-negative uniformly distributed random numbers (e.g., $\{x: x \sim U(a, b), a \geq 0\}$), every x can be mapped to its binary representation (e.g., 4 can be mapped to 100). Because x is uniformly distributed, if the maximum number of leading zeros in the binary representation is known, an estimate is known for how many elements are in the set, S. For example, if the maximum number of leading 0's is 3 (000), then there will be $2^3=8$ elements in S (e.g., in base 2: 000, 001, 010, 011, 100, 101, 110, 111 or in base 10: 0, 1, 2, 3, 4, 5, 6, 7).

Assuming the data is non-uniform or non-numeric, a hash function may be used to uniformly assign unique numbers to each unique value in a hash data set. For example, using two unique strings, "a" and "b," a 1-bit hash function may be used to assign "a" to 0 and "b" to 1. Based on the above observation corresponding to the maximum number of leading zeros, there are $2^1$ unique values. With a 32-bit or 64-bit hash function, lots of unique values can be represented and need to find the maximum number of leading zeros to have an estimate of how much uniqueness is in the data.

While a 32-bit hash function gives the ability to represent many unique values without re-using hash values, some examples may have much less than $2^{32}$ unique values (e.g., when the data is sparse in the hash space). In such examples, there is a high variance in the count based on the specific choice of hashing function (or, which hash values are being assigned). HLL addresses this variance problem. Hashed values are sorted into subsets using an address and a uniqueness estimate (e.g., the maximum number of leading 0's is found in each subset to determine the uniqueness estimate), and the harmonic mean is taken across subsets, thereby allowing correction of the overestimates using underestimates. In some examples, the subsets are arbitrarily small to get more precision. In some examples, if (# of unique values)<5/2*(# of subsets), HLL may be biased and Linear Counting may be used.

HLL sorts hashed values into subsets using an address based on the value's binary representation. For example, new values are added to existing subsets and may be checked if any have more leading zeros than the previous maximum unique estimate of that subset. HLL takes a harmonic mean across subsets. For example, if the estimates from previously seen subsets are saved, subsets may be added or removed that an AME would like to include in a unique count. Taking the above examples together, the conditions of needing to see the entire dataset and saving every unique value to estimate uniqueness is removed, amongst other valuable applications. Examples of the HLL algorithm are described below in conjunction with FIGS. 4-6.

The HLL technique hashes unique values to unique elements of a uniformly distributed set of integers and maps those integers into their binary representation. Further, the HLL technique sorts binary values into subsets using an address based on each value. Additionally, the HLL technique finds the maximum number of leading 0's in a binary value within each subset as an estimate of uniqueness in the data. For example, the HLL technique may add new values to existing subsets and may check if any have more leading zeros than the previous max of the subset. The HLL technique finds the harmonic mean of uniqueness estimates across all subsets. For example, if the estimates from previously seen subsets were saved, the HLL technique adds or removes subsets that the user would like to include in the unique count. Taking the above two examples together, the HLL technique removes the limitations of needing to see the entire dataset and saving every unique value to estimate uniqueness.

When producing a union HLL data set between two database proprietor HLL data sets to generate a unique audience count, all bins with matching addresses across the database proprietor HLL data sets are compared between building blocks of the database proprietor HLL data sets that are to be deduplicated. This allows a finding of each bin's maximum unique estimate across the building blocks database proprietor HLL data sets. The harmonic mean is computed based on the bins' unique estimates in the union HLL data sets.

HLL++ may be used as an implementation of HLL in examples disclosed herein. HLL++ uses a 64-bit hash function to reduce the change of two unique values having the same hashed value. Additionally, HLL++ adjusts for bias in switching from Linear Counting to HLL. Additionally, HLL+ uses a sparse representation of subsets, which is more memory efficient.

In some examples, HLL can be utilized to implement on-the-fly deduplication. For example, a DP or user can create HLL building blocks as inputs to deduplication across impressions or platforms. HLL can be implemented within Spark (e.g., databricks) as approxCountDistinct and approcQuantile. Creating HLL building blocks as inputs to deduplication across impressions or platforms is enabled by storing HLL subsets/registers for each building block cut of data. In some examples, projections methodologies may be adapted to perform on-the-fly computations. For example, HLL building blocks may be created as inputs to deduplication across impressions or platforms in digital add ratings (DAR) Desktop misattribution factors (e.g., truncated singular value decomposition (tSVD)). In such an example, an AME or a DP can create building block inputs of HLL data for each campaign time period, site, etc. as data becomes available (e.g., hourly, daily, etc.). When a report is generated for a particular time period. The AME/DP calculates tSVD's panel inputs for each demographic using building blocks belonging to period/campaign/etc. Factors may be updated quarterly or based on any other duration of time. The AME/DP calculates a DP frequency based on the HLL data inputs from a DP, calculates a tSVD matrix, adjusts DP impression sums using the tSVD matrix, and applies DP frequency to impression sums. In some examples, non-coverage can be performed using a similar methodology.

FIG. 1 shows an example operating environment 100 that includes an example audience measurement entity (AME) 102, an example database proprietor A 106A, and example second database proprietor 106B, and example client devices 108. The example AME 102 includes an example AME computer 110 that implements an example audience metrics generator 112 to determine audience sizes based on media impressions logged by the database proprietors 106A, 106B. In the illustrated example of FIG. 1, the AME computer 110 may also implement an impression monitor system to log media impressions reported by the client devices 108. In the illustrated example of FIG. 1, the client devices 108 may be stationary or portable computers, handheld computing devices, smart phones, Internet appliances, and/or any other type of device that may be connected to the Internet and capable of presenting media.

As used herein, an audience size defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once in the audience size for that media item. Audience size may also be referred to as unique audience or deduplicated audience.

As used herein, a media impression is defined as an occurrence of access and/or exposure to media 114 (e.g., an advertisement, a movie, a movie trailer, a song, a web page banner, etc.). Examples disclosed herein may be used to monitor for media impressions of any one or more media types (e.g., video, audio, a web page, an image, text, etc.). In examples disclosed herein, the media 114 may be content and/or advertisements. Examples disclosed herein are not restricted for use with any particular type of media. On the contrary, examples disclosed herein may be implemented in connection with tracking impressions for media of any type or form in a network.

In the illustrated example of FIG. 1, content providers and/or advertisers distribute the media 114 via the Internet to users that access websites and/or online television services (e.g., web-based TV, Internet protocol TV (IPTV), etc.). In some examples, the media 114 is served by media servers of the same internet domains as the database proprietors 106A, 106B. For example, the database proprietors 106A, 106B include corresponding database proprietor servers 118A, 118B that can serve media 114 to their corresponding subscribers via the client devices 108. Examples disclosed herein can be used to generate audience metrics data that measures audience sizes of media served by different ones of the database proprietors 106A, 106B. For example, the database proprietors 106A, 106B may use such audience metrics data to promote their online media serving services (e.g., ad server services, media server services, etc.) to prospective clients. By showing audience metrics data indicative of audience sizes drawn by corresponding ones of the database proprietors 106A, 106B, the database proprietors 106A, 106B can sell their media serving services to customers interested in delivering online media to users.

The media 114 is then presented via the client devices 108. When the media 114 is accessed by the client devices 108, the client devices 108 send impression requests 122A, 122B to the database proprietor servers 118A, 118B to inform the database proprietor servers 118A, 118B of the media accesses. In this manner, the database proprietor servers 118A, 118B can log media impressions in impression records of corresponding database proprietor audience metrics databases 124A, 124B. In some examples, the client devices 108 also send impression requests 122C to the AME 102 so that the AME 102 can log census impressions in an AME audience metrics database 126. In the illustrated example of FIG. 1, the database proprietors 106A, 106B log demographic impressions corresponding to accesses by the client devices 108 to the media 114. Demographic impressions are impressions logged in association with demographic information collected by the database proprietors 106A, 106B from registered subscribers of their services. Also, in the illustrated example of FIG. 1, the AME computer 110 logs census-level media impressions corresponding to accesses by client devices 108 to media 114. Census-level media impressions (e.g., census impressions) are impressions logged regardless of whether demographic information is known for those logged impressions. In some examples, the AME computer 110 does not collect impressions, and examples disclosed herein are based on audience data from impressions collected by the database proprietors 106A, 106B.

In some examples, the media 114 is encoded to include a media identifier (ID). The media ID may be any identifier or information that can be used to identify the corresponding media 114. In some examples, the media ID is an alphanumeric string or value. In some examples, the media ID is a collection of information. For example, if the media 114 is an episode, the media ID may include program name, season number, and episode number. When the media 114 includes advertisements, such advertisements may be content and/or advertisements. The advertisements may be individual, standalone ads and/or may be part of one or more ad campaigns. The ads of the illustrated example are encoded with identification codes (i.e., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of content monitoring (e.g., web pages, movies, television programs, etc.).

In some examples, the media 114 of the illustrated example is tagged or encoded to include monitoring or tag instructions, which are computer-executable monitoring instructions (e.g., Java, JavaScript, or any other computer language or script) that are executed by web browsers that access the media 114 via, for example, the Internet. Execution of the monitoring instructions causes the web browser to send the impression requests 122A, 122B, 122C (e.g., also referred to as tag requests) to one or more specified servers of the AME 102, the database proprietor A 106A, and or the second database proprietor 106B. As used herein, tag requests 122A, 122B, 122C are used by the client devices 108 to report occurrences of media impressions caused by the client devices accessing the media 114. In the illustrated example, the tag requests 122A, 122B includes user-identifying information that the database proprietors 106A, 106B can use to identify the subscriber that accessed the media 114. For example, when a subscriber of the first database proprietor 106A logs into a server of the first database proprietor 106A via a client device 108, the first database proprietor 106A sets a database proprietor cookie on the client device 108 and maps that cookie to the subscriber's identity/account information at the database proprietor server 118a. In examples disclosed herein, subscriber identity and/or subscriber account information includes personally identifiable information (PII) such as full name, street address, residence city and state, telephone numbers, email addresses, ages, dates of birth, social security numbers, demographic information, and/or any other person information provided by subscribers in exchange for services from the database proprietors 106A, 106B. By having such PII information mapped to database proprietor cookies, the first database proprietor 106A can subsequently identify the subscriber based on the database proprietor cookie to determine when that user accessed different media 114 and to log an impression in association with demographics and/or other PII information of that user. In the illustrated example of FIG. 1, the impression requests 122A, 122B include database proprietor cookies of the client devices 108 to inform the database proprietors 106A, 106B of the particular subscribers that accessed the media 114. In some examples, the AME 102 also sets AME cookies in the client devices 108 to identify users that are enrolled in a panel of the AME 102 such that the AME 102 collects PII information of people that agree to have their internet activities monitored by the AME 102.

The tag requests 122A, 122B, 122C may be implemented using HTTP requests. However, whereas HTTP requests are network communications that traditionally identify web pages or other resources to be downloaded, the tag requests 122A, 122B, 122C of the illustrated example are network communications that include audience measurement information (e.g., ad campaign identification, content identifier, and/or user identification information) as their payloads. The server (e.g., the AME computer 110 and/or the database proprietor servers 118A, 118B) to which the tag requests 122A, 122B, 122C are directed is programmed to log occurrences of impressions reported by the tag requests 122A, 122B, 122C. Further examples of monitoring instructions (e.g., beacon instructions) and uses thereof to collect impression data are disclosed in U.S. Pat. No. 8,370,489 entitled "Methods and Apparatus to Determine Impressions using Distributed Demographic Information," which is hereby incorporated herein by reference in its entirety.

In other examples, in which the media 114 is accessed by apps on mobile devices, tablets, computers, etc. (e.g., that do not employ cookies and/or do not execute instructions in a web browser environment), an app publisher (e.g., an app store) can provide a data collector in an install package of an app for installation at the client devices 108. When a client device 108 downloads the app and consents to the accompanying data collector being installed at the client device 108 for purposes of audience/media/data analytics, the data collector can detect when the media 114 is accessed at the client device 108 and causes the client device 108 to send one or more of the impression requests 122A, 122B, 122C to report the access to the media 114. In such examples, the data collector can obtain user identifiers and/or device identifiers stored in the client devices 108 and send them in the impression requests 122A, 122B, 122C enable the database proprietors 106A, 106B and/or the AME 102 to log impressions. Further examples of using a collector in client devices to collect impression data are disclosed in U.S. Pat. No. 8,930,701 entitled "Methods and Apparatus to Collect Distributed User Information for Media Impressions and Search Terms," and in U.S. Pat. No. 9,237,138 entitled "Methods and Apparatus to Collect Distributed User Information for Media Impressions and Search Terms," both of which are hereby incorporated herein by reference in their entireties.

In the illustrated example, the database proprietors 106A, 106B would like to collaborate with the AME 102 so that the AME 102 can operate as an independent party that measures and/or verifies audience measurement information pertaining to the media 114 accessed by the subscribers of the database proprietors 106A, 106B. However, the database proprietors 106A, 106B desire to do so while protecting the privacies of their subscribers by not sharing or revealing subscriber identities, subscriber information, and/or any other subscriber PII information to outside parties. In examples disclosed herein, to share impression data with the AME 102 without revealing subscriber identities, subscriber information, and/or any other subscriber PII information, the database proprietors 106A, 106B process their collected impression data to generate corresponding HLL data 132A, 132B as described below in connection with FIG. 2. In the illustrated example, to generate such HLL data 132A, 132B, the database proprietors 106A, 106B are provided corresponding DP audience metrics generators 107A, 107B.

As used herein, HLL data is an arrangement of data generated by an HLL algorithm and approximates the number of distinct elements (e.g., PII information) associated with a database proprietor. In the illustrated example, the HLL data is a vector bins storing uniqueness estimates of hash values corresponding to those bins. In other examples, the HLL data can be any other suitable data structure (e.g., a matrix, etc.). In examples disclosed herein, the HLL data is sorted into bins (e.g., a location in a vector, etc.), and each bin corresponds to an address based on a common portion of hash values in that bin. In some examples, each set of HLL data 132A, 132B has an associated harmonic mean value across all bins of that HLL data 132A, 132B to calculate an overall unique count.

Figure 2:
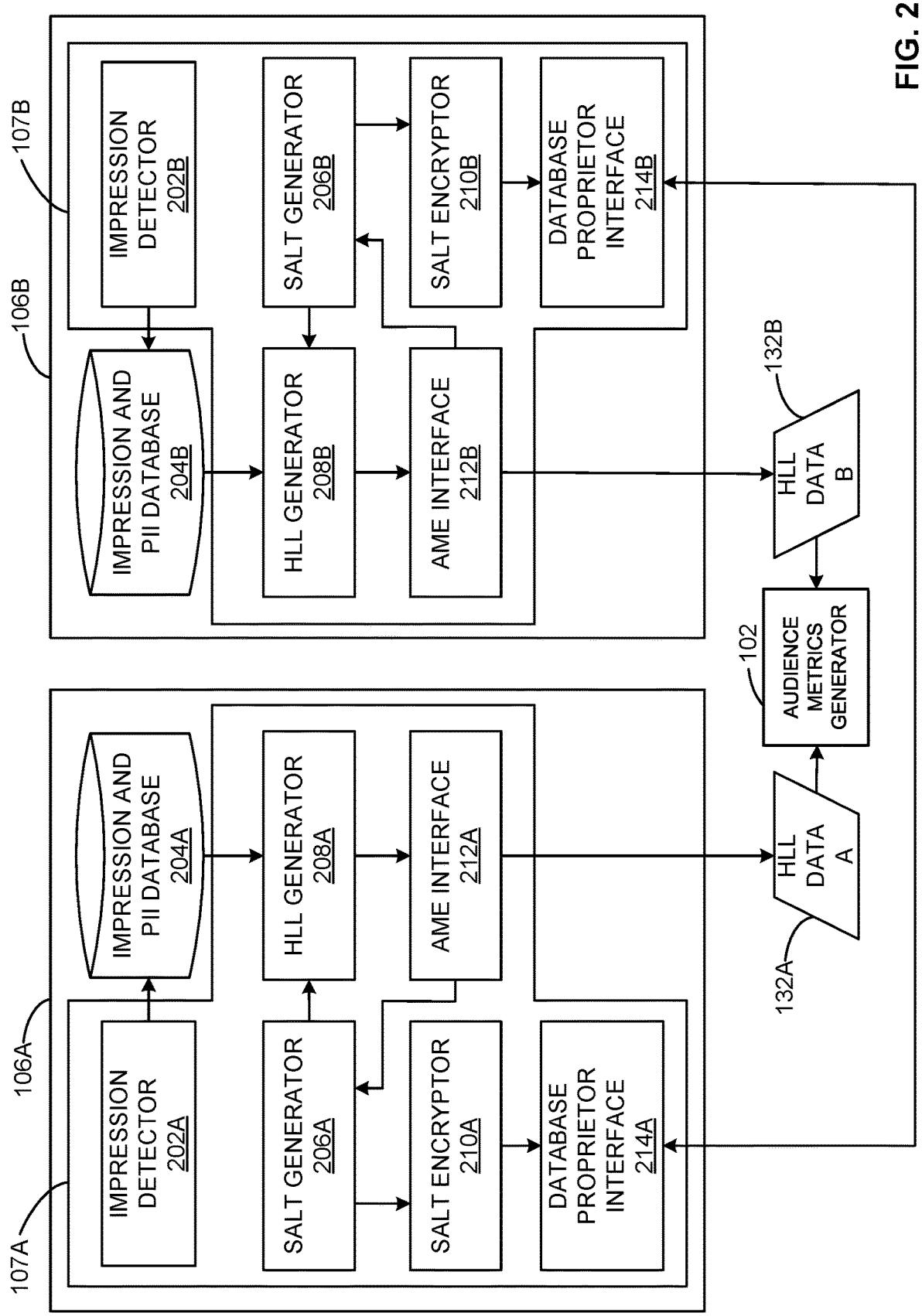
FIG. 2 is a block diagram of an example implementation of an example database proprietor (DP) audience metrics generator at the example database proprietors of FIG. 1 that may be used to generate audience measurement data as hyperloglog (HLL) data that protects the privacies of audience members.

FIG. 2 is a block diagram of an example implementation of an example DP audience metrics generator 107A, 107B at the example database proprietors of FIG. 1 that may be used to generate audience measurement data as hyperloglog (HLL) data that protects the privacies of audience members. The example first DP audience metrics generator 107A includes an example first impression detector 202A, an example first salt generator 206A, an example first HLL generator 208A, an example first salt encryptor 210A, an example first AME interface 212A, and an example first database proprietor interface 214A. In the illustrated example, the DP audience metrics generator 107A is in communication with an example first impression and PII database 204A. The example second DP audience metrics generator 107B includes an example second impression detector 202B, an example second salt generator 206B, an example second HLL generator 208B, an example second salt encryptor 210B, an example second AME interface 212B, and example second database proprietor interface 214B. In the illustrated example, the second DP audience metrics generator 107B is in communication with an example second impression and PII database 204B. The examples described below are describe in conjunction with the first database proprietor 106A (e.g., the first DP audience metrics generator 107A of the first database proprietor 106A). However, any or all of the functions of the first database proprietor 106A can be performed by the second database proprietor 106B (e.g., the second DP audience metrics generator 107B of the second database proprietor 106B). For example, some or all of the functions of the first impression detector 202A can be implemented by the second impression detector 202B.

The example first impression detector 202A collects user impression data. For example, the impression detector 202A can detect impression requests 122A transmitted to the first database proprietor 106A from the client devices 108. In some examples, the impression detector 202A can detect (e.g., extract, decode, etc.) media ID corresponding to the media 114 and associated with the impression request 122A. In some examples, the impression detector 202A can associate the impression request 122A with PII information (e.g., addresses, ages, email addresses, username, dates of birth, social security numbers, demographic information, and/or any other person information, etc.). For example, the first impression request 122A can include a cookie set by the database proprietor 106A in association with a client device 108. In this manner, the database proprietor 106A can associate the impression with PII information of a subscriber that was logged into a service of the database proprietor 106A when the database proprietor 106A set the cookie in the client device 108.

The example first impression and PII database 204A is a database that contains a data structure (e.g., a matrix, a vector, etc.) associating detected impressions with PII information of users of the first database proprietor 106A. For example, the first impression and PII database 204A can include identifiers associated with each impression identified by the first impression detector 202A (e.g., a media ID, a time, etc.) and PII information.

The example first salt generator 206A generates a salt to use to salt the PII information associated with each impression in the first impression and PII database 204A. For example, the first salt generator 206A can generate a salt using a campaign attribute (e.g., a date range associated with an advertising campaign, etc.). In some examples, the first salt generator 206A can use a random number generator to generate a salt. In other examples, the first salt generator 206A can use any other suitable means for generating a salt. In some examples, the first salt generator 206A generates a shared salt to be used by the second database proprietor 106B.

The example first HLL generator 208A generates the HLL data 132A based on the detected impressions and the PII information stored in the impression and PII database 204A. For example, the first HLL generator 208A can generate HLL data in which each bin (e.g., a location in the HLL data structure, etc.) corresponds to none, one, or more hashes of PII information associated with impressions detected in a time range (e.g., an hour, a day, a particular date range associated with an advertising campaign, etc.). In some examples, to generate a hash based on a PII input, the first HLL generator 208A concatenates the PII input with the salt generated by the first salt generator 206A before hashing the PII input. In examples disclosed, the first HLL generator 208A processes the HLL data 132A as binary values. In some examples, the first HLL generator 208A can generate a bin address (e.g., a leading set of bits of the generated hash, etc.) and a bin value (e.g., a trailing set of bits of the generated hash, etc.) for a hash value based on the MSBs of the hash value. In some examples, the first HLL generator 208A generates a uniqueness estimate value associated with each element of the HLL data. In some examples, the first HLL generator 208A generates the uniqueness estimate value based on the number of leading zeros (e.g., zeros in MSBs that start with zero) in each hash value. Example functions of the first HLL generator 208A are described below in greater detail in conjunction with FIGS. 4-6.

The example first salt encryptor 210A encrypts the salt generated by the first salt generator 206A with an encryption key. For example, the first salt encryptor 210A can use an encryption key associated with the first database proprietor 106A, the second database proprietor 106B, and/or the AME 102. In other examples, the first salt encryptor 210A can use a public key to encrypt the salt. In some examples, the first salt encryptor 210A can be omitted. In such examples, the salt generated by the first salt generator 206A is unencrypted.

The example first AME interface 212A allows the first database proprietor 106A of the illustrated example of FIGS. 1 and 2 to communicate with the AME 102. For example, the first AME interface 212A can be implemented by wide area network communication hardware (e.g., a gateway, a router, etc.). In some examples, the first AME interface 212A enables the first HLL generator 208A to transmit the generated HLL data 132A to the AME 102. In some examples, the first database proprietor 106A to receive communications from the AME 102 (e.g., instructions to rotate the salt, etc.). In some examples, the first AME interface 212A can be absent. In such examples, the first database proprietor 106A can communicate with the AME 102 via any other suitable method (e.g., communicating via physical records, communicating via a third part, communicating via the second database proprietor 106B, etc.).

The example first database proprietor interface 214A allows the first database proprietor 106A to communicate with the second database proprietor 106B and/or other database proprietors. For example, the first database proprietor interface 214A can be implemented by wide area network communication hardware (e.g., a gateway, a router, etc.). In some examples, the first database proprietor interface 214A enables the first salt generator 206A and/or the salt encryptor 210 to transmit a generated salt, an encryption key to the second database proprietor 106B, and/or any other communications. In some examples, the first database proprietor interface 214A can be absent. In such examples, the first database proprietor 106A can communicate with the second database proprietor 106B via any other suitable method (e.g., communicating via physical records, communicating via a third part, communicating via the second database proprietor 106B, etc.). In the illustrated example, the first AME interface 212A and the first database proprietor interface 214A are illustrated as separate. In other examples, the first AME interface 212A and the first database proprietor interface 214A can be implemented by a common interface.

While an example manner of implementing the first DP audience metrics generator 107A and the second DP audience metrics generator 107B of FIG. 1 is illustrated in FIG. 2, one or more of the elements, processes and/or devices illustrated in FIG. 2 may be combined, divided, re-arranged, omitted, eliminated and/or implemented in any other way. Further, the example first impression detector 202A, the example first impression and PII database 204A, the example first salt generator 206A, the example first HLL generator 208A, the example first salt encryptor 210A, the example first AME interface 212A, the example first database proprietor interface 214A, the example second impression detector 202B, the example second impression and PII database 204B, the example second salt generator 206B, the example second HLL generator 208B, the example second salt encryptor 210B, the example second AME interface 212B, the example second database proprietor interface 214B, and/or more generally, the example DP audience metrics generator 107A of FIG. 2 may be implemented by hardware, software, firmware and/or any combination of hardware, software and/or firmware. Thus, for example, any of the example first impression detector 202A, the example first impression and PII database 204A, the example first salt generator 206A, the example first HLL generator 208A, the example first salt encryptor 210A, the example first AME interface 212A, the example first database proprietor interface 214A, the example second impression detector 202B, the example second impression and PII database 204B, the example second salt generator 206B, the example second HLL generator 208B, the example second salt encryptor 210B, the example second AME interface 212B, the example second database proprietor interface 214B and/or, more generally, the example DP audience metrics generators 107A, 107B of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, first impression detector 202A, the example first impression and PII database 204A, the example first salt generator 206A, the example first HLL generator 208A, the example first salt encryptor 210A, the example first AME interface 212A, the example first database proprietor interface 214A, the example second impression detector 202B, the example second impression and PII database 204B, the example second salt generator 206B, the example second HLL generator 208B, the example second salt encryptor 210B, the example second AME interface 212B, the example second database proprietor interface 214B is/are hereby expressly defined to include a non-transitory computer readable storage device or storage disk such as a memory, a digital versatile disk (DVD), a compact disk (CD), a Blu-ray disk, etc. including the software and/or firmware. Further still, the example DP audience metrics generator 107A, 107B of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
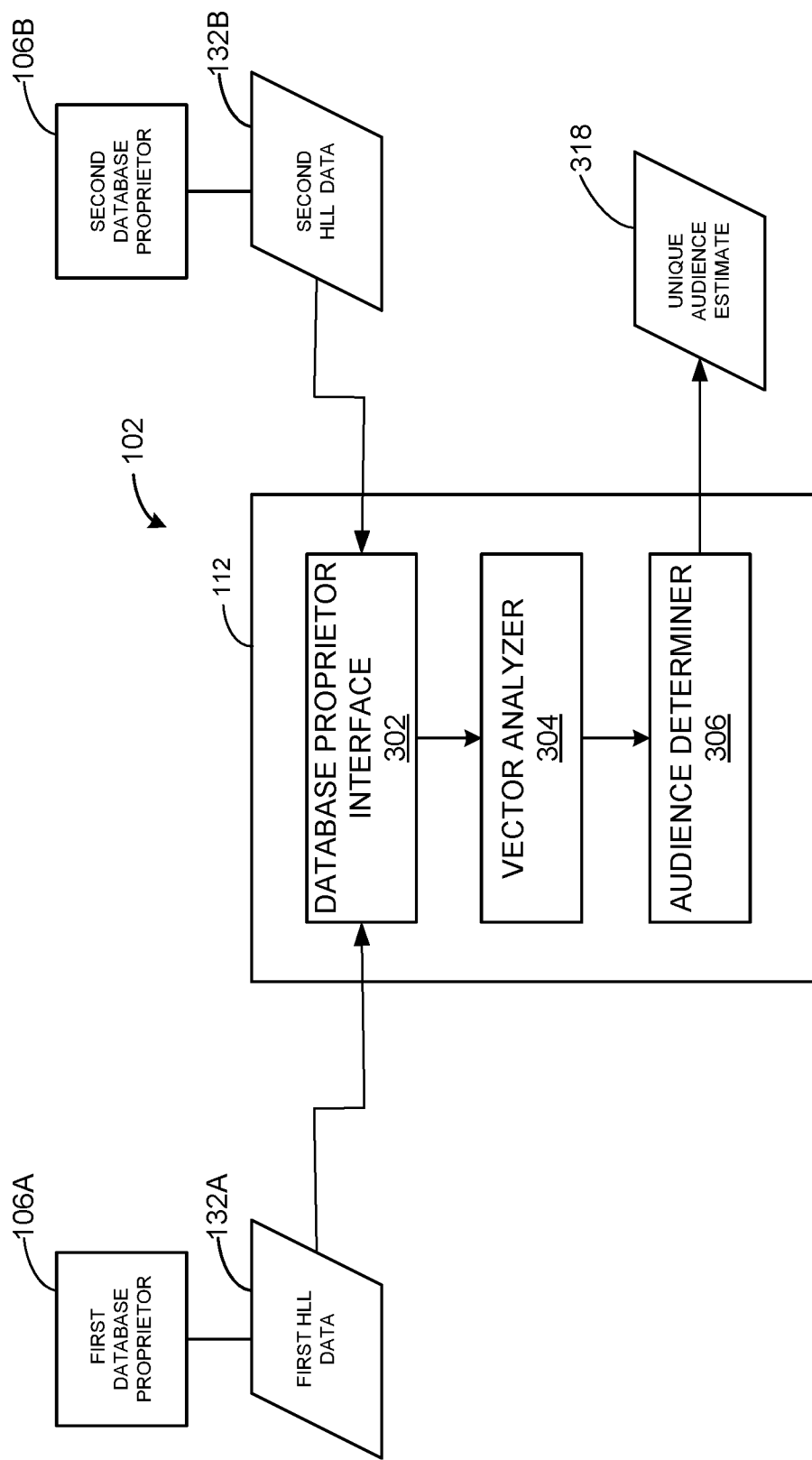
FIG. 3 is a block diagram of an example implementation of the AME audience metrics generator of FIG. 1 to process HLL data from the database proprietors of FIGS. 1 and 2 to generate audience sizes of media.

FIG. 3 is a block diagram of an example implementation of the AME audience metrics generator of FIG. 1 to process HLL data from the database proprietors of FIGS. 1 and 2 to generate audience sizes of media. The example audience metrics generator 112 includes an example database proprietor interface 302, an example vector analyzer 304 and an example audience determiner 306.

The example database proprietor interface 302 allows the AME 102 and/or the audience metrics generator 112 to communicate with the first database proprietor 106A the second database proprietor 106B and/or other database proprietors. For example, the example database proprietor interface 302 can be implemented via WAN hardware. In the illustrated example of FIG. 3, the database proprietor interface 302 receives the first HLL data 132A from the first database proprietor 106A and the second HLL data 132B from the second database proprietor 106B. In some examples, the database proprietor interface 302 can receive additional HLL data from other database proprietors. In some examples, the database proprietor interface 302 sends any other suitable information to the database proprietors 106A, 106B. In some examples, the database proprietor interface 302 can be absent. In such examples, the AME 102 and/or the audience metrics generator 112 can communicate with the database proprietors 106A, 106B via any other suitable method (e.g., communicating via physical records, communicating via a third party, etc.).

The example vector analyzer 304 determines union HLL data based on the received HLL data 132A, 132B from the database proprietors 106A, 106B by performing a union (e.g., combining, etc.) of the data sets of the audiences represented via the HLL data 132A, 132B. For example, the vector analyzer 304 can sort the received HLL data 132A, 132B by the addresses of the data bins and the uniqueness estimate values associated therewith. In some examples, the vector analyzer 304 can combine the sets by taking the max uniqueness estimate values associated with each bin address. For example, for each bin address (e.g., a first set of bits of the hash value associated with that bin, etc.), the vector analyzer 304 compares a unique estimate value of a bin in the first HLL data 132A with a uniqueness estimate value of a corresponding bin with the same bin address in the second HLL data 132B to determine the uniqueness estimate value that is the greatest or the maximum uniqueness estimate value between the two uniqueness estimate values. In this manner, the example vector analyzer 304 compares uniqueness estimate values between same-address bins of the HLL data 132A, 132B to generate the union HLL data based on the determined maximum uniqueness estimate values between the corresponding bins. Example functions of the vector analyzer 304 are described below in conjunction with FIGS. 4-6.

The example audience determiner 306 determines the total number of deduplicated unique audience members based on the union HLL data set generated by the vector analyzer 304. For example, the audience determiner 306 can calculate the normalized harmonic mean of the union HLL data. Example functions of the audience determiner 306 are described below in conjunction with FIG. 6.

While an example manner of implementing the audience metrics generator 112 of FIG. 1 is illustrated in FIG. 3, one or more of the elements, processes and/or devices illustrated in FIG. 3 may be combined, divided, re-arranged, omitted, eliminated and/or implemented in any other way. Further, the example database proprietor interface 302, the example vector analyzer 304, the example audience determiner 306 and/or, more generally, the example audience metrics generator 112 of FIG. 3 may be implemented by hardware, software, firmware and/or any combination of hardware, software and/or firmware. Thus, for example, any of the example database proprietor interface 302, the example vector analyzer 304, the example audience determiner 306 and/or, more generally, the example audience metrics generator 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, database proprietor interface 302, the example vector analyzer 304, the example audience determiner 306 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience metrics generator 112 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
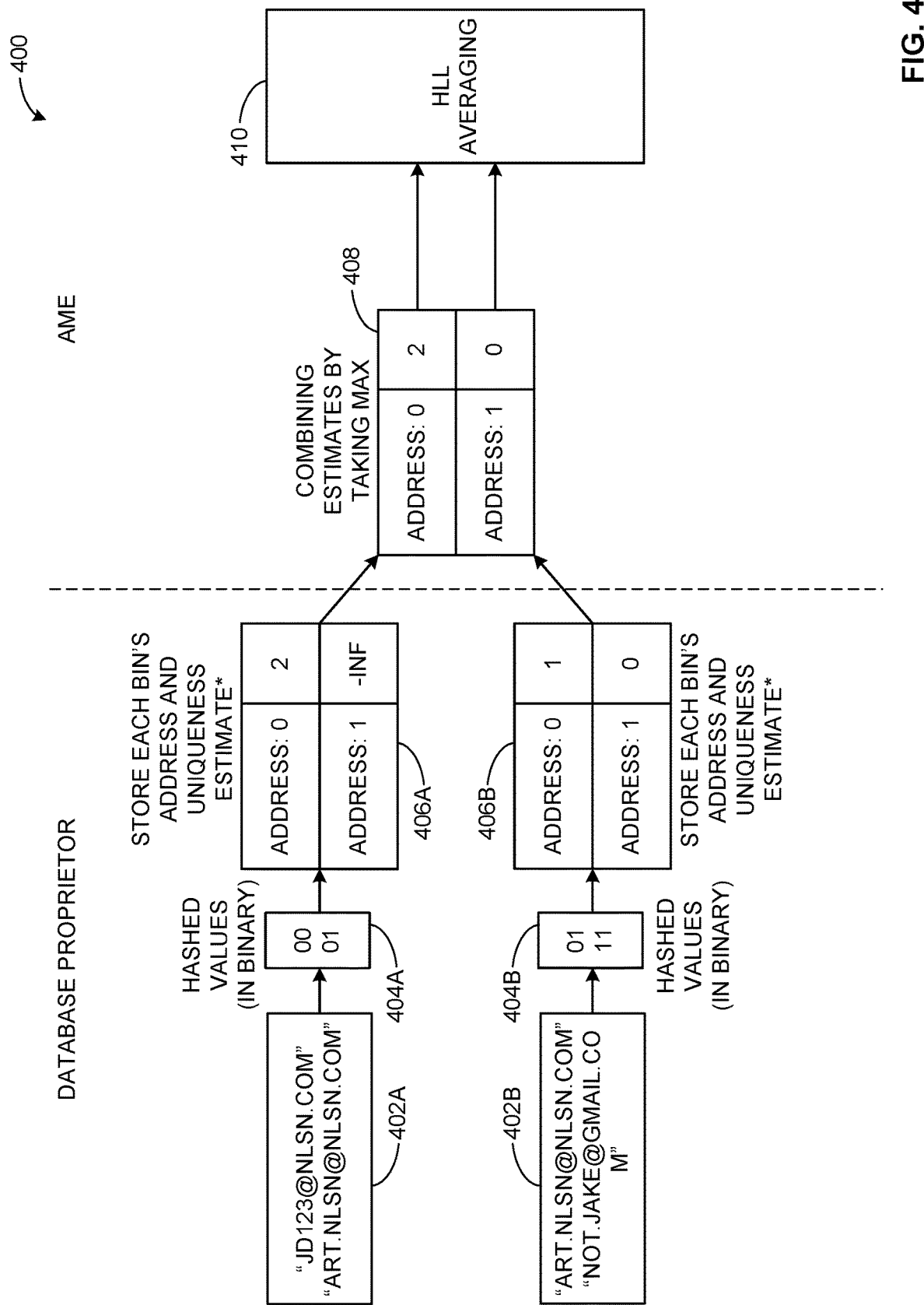
FIG. 4 is an example diagram illustrating generating of HLL data by the DP audience metrics generator of FIG. 2, and processing of the HLL data by the audience metrics generator of FIGS. 1 and 3.

FIG. 4 is an example diagram 400 illustrating generating of HLL data 406A, 406B by the HLL generators 208A, 208B of FIG. 2, and processing of the HLL data 406A, 406B by the audience metrics generator 112 of FIGS. 1 and 3. The example diagram 400 includes an example first PII set 402A, an example second PII set 402B, an example first hashed vector 404A, an example second hashed values vector 404B, the example first HLL data 406A, an example second HLL data 406B, example union HLL data 408, and an example HLL averaging function 410. In the illustrated example, the PII sets 402A, 402B, the hashed values vectors 404A, 404B, and the HLL data 406A, 406B correspond to operations of the database proprietors 106A, 106B. In the illustrated example, the union HLL data 408 and the HLL averaging function 410 correspond to operations of the AME 102.

The example PII sets 402A, 402B are PII information associated with detected impressions. For example, the first example PII set 402A corresponds to an impression detected by the first database proprietor 106A and the second example PII set 402B corresponds to an impression detected by the second database proprietor 106B. In the illustrated example, the example PII sets 402A, 402B include exclusively email addresses. In other examples, the PII sets 402A, 402B can include any other PII information or combination of PII information. In some examples, the PII sets 402A, 402B are retrieved from a database associated with the first database proprietor 106A (e.g., the impression and PII database 204A, etc.). In some examples, the PII information can be appended with a salt (e.g., generated by the salt generator 206A, etc.).

The example hashed values vectors 404A, 404B (e.g., hash vectors, etc.) are generated when the HLL generators 208A, 208B process PII sets 402A, 402B. In some examples, the HLL generators 208A, 208B hash each PII data input in the PII sets 402A, 402B using an HLL algorithm. In other examples, the HLL generators 208A, 208B can use any other suitable algorithm for generating the hashed values vectors 404A, 404B. In the illustrated example, the hashed values vectors 404A, 404B are depicted in binary. In other examples, the hashed values vectors 404A, 404B can be stored in any other suitable manner (e.g., floating point, ASCII, etc.).

The example HLL data 406A, 406B are generated when the HLL generators 208A, 208B store each bin address and uniqueness estimate of the hashed values vectors 404A, 404B. For example, the HLL generators 208A, 208B can also determine a uniqueness estimate corresponding to a likelihood that the value of the bin address contains at least one unique audience member. For example, the HLL generator 208A, 208B can determine the maximum number of leading zeros represented in the hashed values vectors 404A, 404B. In the illustrated example of FIG. 4, the hashed values vector 404A is divided into a bin addresses "0" and "1," which correspond to the most significant bits (e.g., all bits by the last bit, etc.) of the hash values. In the illustrated example of FIG. 4, the first HLL generator 208A places the hash value "00" into the "0" bin address because the hash value "00" has a leading bit of 0. In the illustrated example of FIG. 4, the first HLL generator 208A places the hash value "01" into the "0" bin address because the hash value "01" has a leading bit of 0. The HLL generator 208A determines the uniqueness value of bin address "0" is "2" because the hash value "00" has two leading zeros. The first HLL generator 208A determines that the uniqueness value of the "1" bin address is undefined because there are no hash values associated with the "1" bin address. In the illustrated example, the undefined value in the first HLL data 406A is "–INF." In other examples, the undefined value can be any suitable value (e.g., –1, –10, null, etc.).

In the illustrated example of FIG. 4, the HLL generator 208B places the hash value "01" into the "0" bin address because the hash value "01" has a leading bit of 0 (e.g., bin address=0). In the illustrated example of FIG. 4, the HLL generator 208B places the hash value "11" into the "1" bin address because the hash value "11" has a leading bit of 1 (e.g., bin address=1). The HLL generator 208B determines the uniqueness value of bin address "0" is "1" because the hash value "01" has one leading zeros. The HLL generator 208B determines that the uniqueness value of the "1" bin address is "0" because the hash value "11" has zero leading zeros.

The example union HLL data 408 is based on the example HLL data 406A, 406B after uniqueness estimate values are compared by the vector analyzer 304. In the illustrated example of FIG. 4, the vector analyzer 304 determines the maximum uniqueness value associated with each bin address of the HLL data 406A, 406B. For example, the "0" bin address has a maximum uniqueness of "2" which is determined by the vector analyzer 304 comparing the uniqueness estimate value of the "0" bin address of the first HLL data 406A (e.g., "2," etc.) to the uniqueness estimate value of the "0" bin address of the second HLL data 406B (e.g., "1," etc.). For example, the "1" bin address has a maximum uniqueness of "0" which is determined by the vector analyzer 304 comparing the uniqueness estimate value (e.g., "–INF") of the "1" bin address of the first HLL data 406A to the uniqueness estimate value (e.g., "0") of the "1" bin address of the second HLL data 406B.

The example HLL averaging function 410 determines the unique audience count (e.g., unique audience size) associated with the union HLL data 408. For example, the HLL averaging function 410 can determine the harmonic mean of the union HLL data 408. In other examples, the HLL averaging function 410 can determine the unique audience count by any other suitable means. The functioning of the HLL averaging function 410 is described below in greater detail with reference to FIG. 6.

Figure 5:
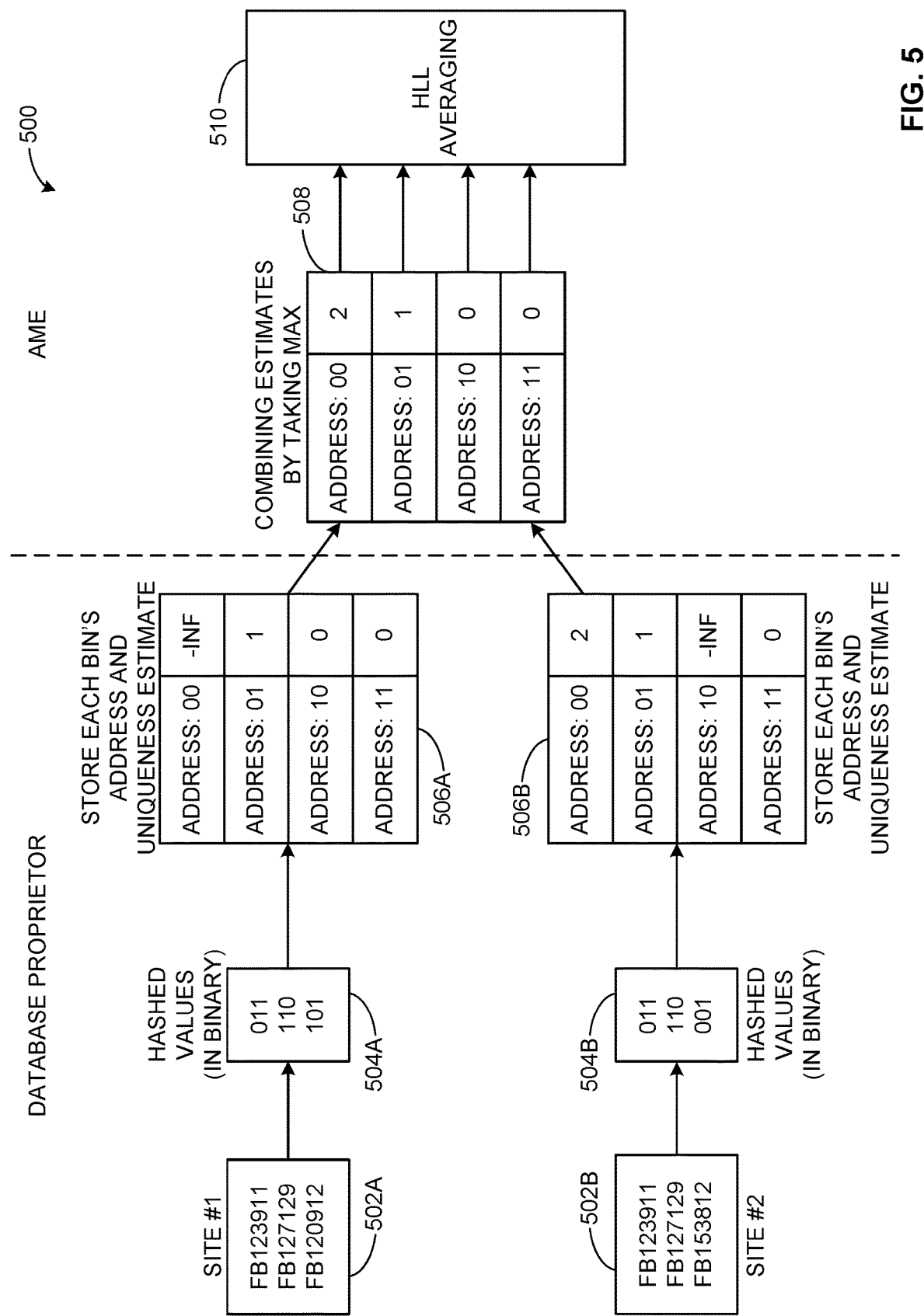
FIG. 5 is another example diagram illustrating generating of HLL data by the DP audience metrics generator of FIG. 2, and processing of the HLL data by the audience metrics generator of FIGS. 1 and 3.

FIG. 5 is another example diagram 500 illustrating generating of HLL data 506A, 506B by the HLL generators 208A, 208B of FIG. 2, and processing of the HLL data 406A, 406B by the audience metrics generator 102 of FIGS. 1 and 3. The example diagram 500 includes an example first PII data set 502A, an example second PII data set 502B, an example first hashed vector 504A, an example second hashed vector 504B, the example first HLL data 506A, the example second HLLdata506B, an example unioned set address data structure 508, and an example HLL averaging function 510. In the illustrated example, the PII sets 502A, 502B, the hashed value vectors 504A, 504B, and the HLL data 506A, 506B correspond to operations of the database proprietors 106A, 106B. In the illustrated example, the union HLL data 508 and the HLL averaging 510 correspond to operations of the AME 102.

The example PII sets 502A, 502B are PII information associated with detected impressions using database proprietor cookies. For example, the first example PII set 502A corresponds to an impression detected by the first database proprietor 106A using a cookie and the second example PII set 502B corresponds to an impression detected by the second database proprietor 106B using a cookie. In the illustrated example, the example PII sets 402A, 402B include exclusively database proprietor cookies. In other examples, the PII sets 402A, 402B can include any other PII information or combination of PII information. In some examples, the PII sets 402A, 402B are retrieved from a database associated with the first database proprietor 106A (e.g., the impression and PII database 204A, etc.). In some examples, the PII information can be appended with a salt (e.g., generated by the salt generator 206A, etc.).

The example hashed values vectors 504A, 504B are generated when the HLL generators 208A, 208B process PII sets 502A, 502B. In some examples, the HLL generators 208A, 208B hash the each PII in the PII sets 502A, 502B using an HLL algorithm. In other examples, the HLL generators 208a, 208B can use any other suitable algorithm for generating the hashed values vectors 504A, 504B. In the illustrated example, the hashed values vectors 504A, 504B are depicted in binary. In other examples, the hashed values vectors 504A, 504B can be stored in any other suitable manner (e.g., floating point, ASCII, etc.).

The example HLL data 506A, 506B are generated when the HLL generators 208A, 208B store each bin address and uniqueness estimate of the hashed values vectors 504A, 504B. For example, the HLL generators 208A, 208B can also determine a uniqueness estimate corresponding to a likelihood that the value of the bin address contains at least one unique audience member. For example, the first HLL generator 208A, 208B can determine the maximum number of leading zeros represented in the hashed values vectors 504A, 504B. In the illustrated example of FIG. 5, the hashed vector 504A is divided into a bin addresses "00," "01," "10," and "11," which correspond to the most significant bits (e.g., all bits by the last bit, etc.) of the hash values. In the illustrated example of FIG. 5, the first HLL generator 208A places the hash value "011" into the "01" bin address because the hash value "011" has a leading bit of "01." In the illustrated example of FIG. 5, the HLL generator 208A places the hash value "110" into the "11" bin address because the hash value "110" has a leading bit of "11." In the illustrated example of FIG. 5, the HLL generator 208A places the hash value "101" into the "10" bin address because the hash value "101" has a leading bit of "10." The HLL generator 208A determines that the uniqueness value of the "00" bin address is undefined because there are no hash values associated with the "00" bin address. The HLL generator 208A determines the uniqueness value of bin address "01" is "1" because the hash value "011" has one leading zeros. The first HLL generator 208A determines the uniqueness value of bin address "10" is "0" because the hash value "101" has no leading zeros. The HLL generator 208A determines the uniqueness value of bin address "11" is "0" because the hash value "101" has no leading zeros.

In the illustrated example of FIG. 5, the hashed values vector 504B is divided into a bin addresses "00," "01," "10," and "11," which correspond to the most significant bits (e.g., all bits by the last bit, etc.) of the hash values. In the illustrated example of FIG. 5, the HLL generator 208B places the hash value "011" into the "01" bin address because the hash value "011" has a leading bit of "01" (e.g., bin address=01). In the illustrated example of FIG. 5, the HLL generator 208B places the hash value "110" into the "11" bin address because the hash value "110" has a leading bit of "11" (e.g., bin address=11). In the illustrated example of FIG. 5, the HLL generator 208B places the hash value "101" into the "10" bin address because the hash value "101" has a leading bit of "10" (e.g., bin address=10). The HLL generator 208B determines the uniqueness value of bin address "00" is "2" because the hash value "001" has two leading zeros. The HLL generator 208B determines the uniqueness value of bin address "01" is "1" because the hash value "011" has one leading zeros. The HLL generator 208B determines that the uniqueness value of the "10" bin address is undefined because there are no hash values associated with the "00" bin address. The HLL generator 208B determines the uniqueness value of bin address "11" is "0" because the hash value "110" has no leading zeros. In some examples, the address of the bin corresponds to the location of the hashed values vectors 504A, 504B.

The example union HLL data 508 is formed example HLL data 506A, 506B after uniqueness estimate values are compared by the vector analyzer 304. In the illustrated example of FIG. 5, the vector analyzer 304 determines the maximum uniqueness value associated with each bin address of the HLL data 506A, 506B. For example, the "00" bin address has a maximum uniqueness of "2" which is determined by the vector analyzer 304 comparing the uniqueness estimate value of the "00" bin address of the first HLL data 506A (e.g., "−INF,") to the uniqueness estimate value of the "00" bin address of the HLL data structure 506B (e.g., "2,"). For example, the "01" bin address has a maximum uniqueness of "1" which is determined by the vector analyzer 304 comparing the uniqueness estimate value of the "01" bin address of the first bin address structure 506A (e.g., "1,") to the uniqueness estimate value of the "01" bin address of the second bin address structure 506B (e.g., "1,"). For example, the "10" bin address has a maximum uniqueness of "0" which is determined by the vector analyzer 304 comparing the uniqueness estimate value of the "10" bin address of the first bin address structure 506A (e.g., "0,") to the uniqueness estimate value of the "10" bin address of the first bin address structure 506B (e.g., "−INF,"). For example, the "11" bin address has a maximum uniqueness of "0" which is determined by the vector analyzer 304 comparing the uniqueness estimate value of the "1" bin address of the first HLL data 506A (e.g., "0,") to the uniqueness estimate value of the "1" bin address of the second HLL data 506B (e.g., "0,").

The example HLL averaging function 510 determines the unique audience count (e.g., unique audience size) associated with the union HLL data 508. For example, the HLL averaging function 510 can determine the harmonic mean of the unioned set. In other examples, the HLL averaging function 510 can determine the unique audience count by any other suitable means. The functioning of the HLL averaging function 510 is described below in greater detail with reference to FIG. 6.

Figure 6:
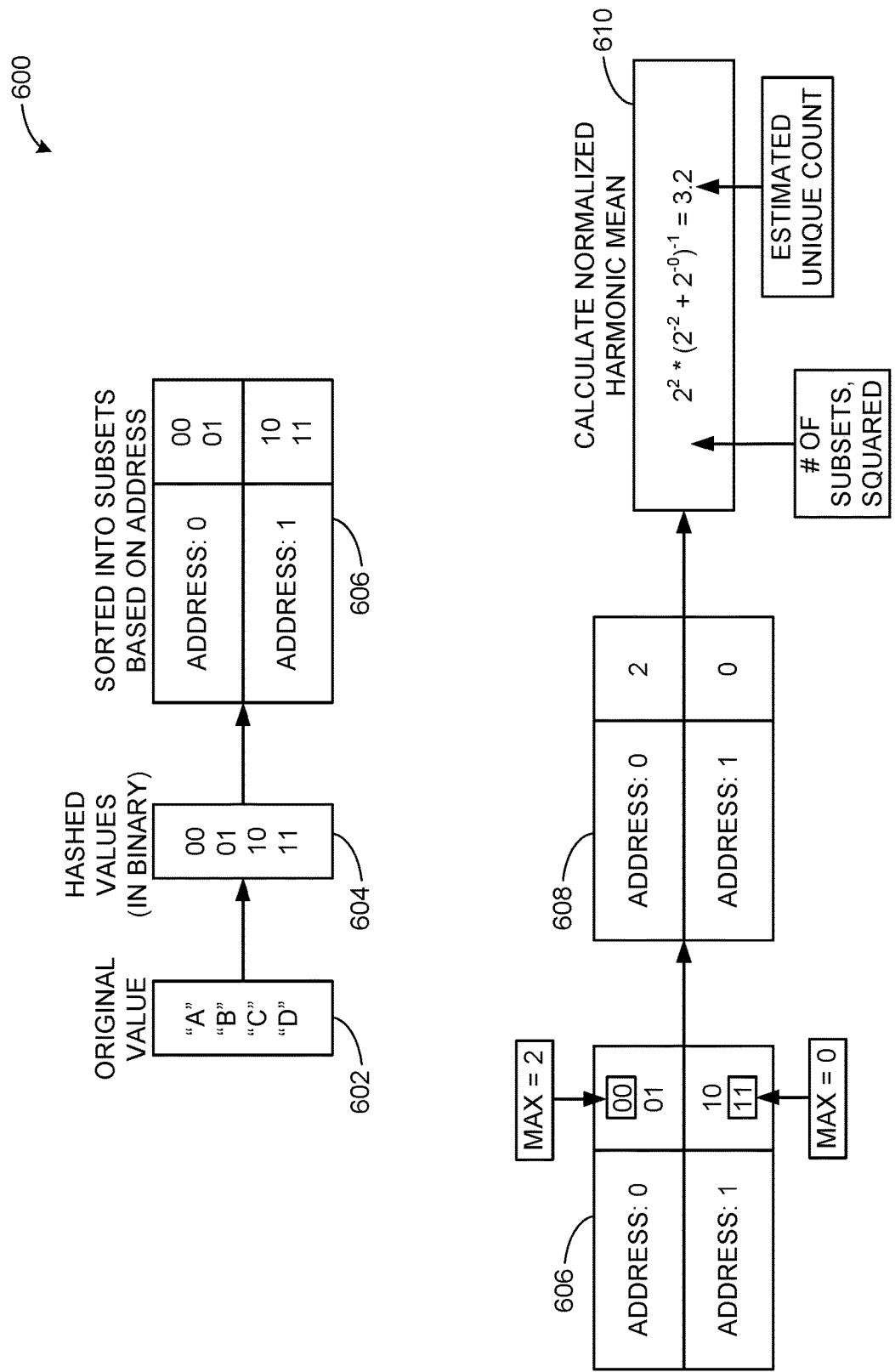
FIG. 6 is an example diagram illustrating a manner in which the audience determiner of FIG. 3 determines a normalized harmonic mean based on maximum uniqueness estimates of the HLL data from the from the database proprietors of FIGS. 1 and 2.

FIG. 6 is an example diagram 600 illustrating a manner in which the audience determiner of FIG. 3 determines a normalized harmonic mean based on maximum uniqueness estimates of the HLL data from the from the database proprietors of FIGS. 1 and 2. The example diagram 600 includes an example site data set 602, an example first hashed vector 604, an example first bin address data structure 606, an example HLL data 608, and an example HLL averaging function 610.

The example site data set 602 is a data set including a plurality of elements (e.g., "A," "B," "C," "D," etc.). The example data set 602 can include any suitable data (e.g., PII information, gathered cookies, etc.). In some examples, the data set 602 can be generated via the impression detector 202A and/or impression and PII database 204A.

The example first hashed values vector 604 is generated when the example data set is hashed by the first HLL generator 208A. For example, the first HLL generator 208A can hash the data set 602 using an HLL hashing algorithm, and/or any other suitable algorithm. In some examples, the first HLL generator 208A can appended the elements of the data set with a salt (e.g., a salt generated by the salt generator 206A, etc.). In the illustrated example, the values of the hashed vector 604 are in binary. In other examples, the hashed vector 604 can be formatted in any suitable format (e.g., ASCII, etc.).

The example first HLL data 606 is generated after the first HLL generator 208A sorts each hash value of the hash vector 604 by the bin address associated with each hash value. For example, the first HLL generator 208A determines the bin address of each value in the hash vector based on the leading bits of the hash value (e.g., the bits of the hash values excluding the least significant bit, etc.). In the illustrated example, the first HLL generator 208A sorts the "00" hash value into the "0" bin address based on the first bit of "00" is "0." The HLL generator 208A sorts the "01" hash value into the "0" bin address based on the first bit of "01" is "0." The HLL generator 208A sorts the "10" hash value into the "1" bin address based on the first bit of "10" is "1." The HLL generator 208A sorts the "10" hash value into the "1" bin address based on the first bit of "11" is "1." In other examples, the HLL generator 208A can determine what bin address to sort the hash values into by any other suitable means.

The example second HLL data 608 is generated after the first HLL generator 208A determines the greatest uniqueness estimate of associated with each bin. In the illustrated example of FIG. 6, the first HLL generator 208A determines that maximum uniqueness associated with each bin address. The first HLL generator 208A determines the greatest uniqueness among the hash values in each bin address in the first HLL data 606. For example, the first HLL generator 208A determines the uniqueness of "0" address to be "2" based on "00" have the maximum number of leading zeros (e.g., 2 zeros, etc.). For example, the first HLL generator 208A determines the uniqueness of "1" address to be "0" based on "10" have the maximum number of leading zeros (e.g., 0 zeros, etc.). In other examples, the first HLL generator 208A can determine the uniqueness estimate in any other suitable matter.

The example HLL averaging function 610 determines the estimated unique count (e.g., the estimate number of unique audience members, etc.) by determining the normalized harmonic mean of the second HLL data 608. In other examples, the HLL averaging function 610 can use any other suitable means of determining the estimated unique count of the unique audience count.

Figure 7:
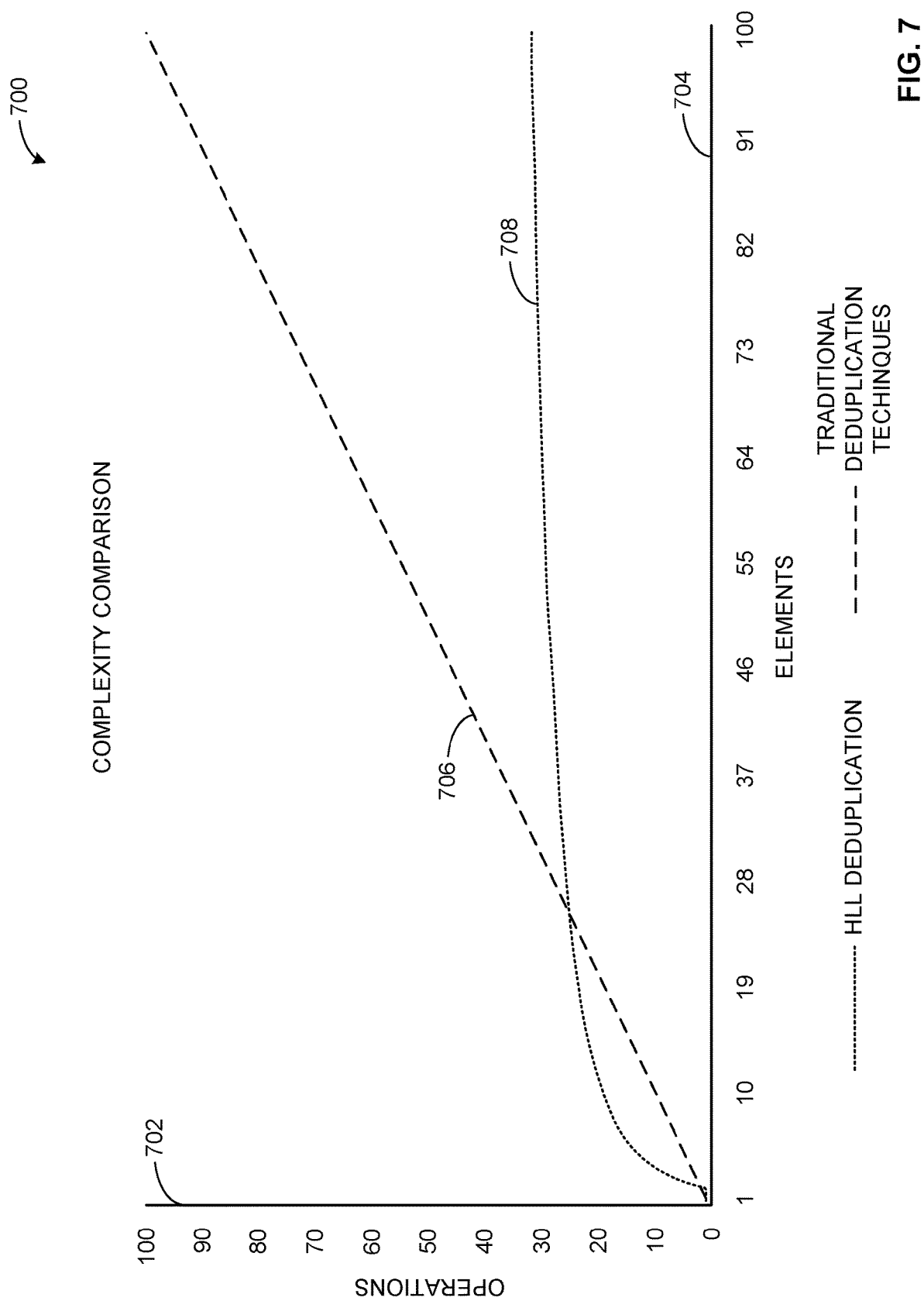
FIG. 7 is an example graph showing the reduction of processing complexity using the examples disclosed herein.

FIG. 7 is an example graph 700 depicting the reduction of processing complexity using the examples described below in conjunction with FIGS. 1-6. The example graph includes an example first axis 702, an example second axis 704, an example first function 706, and an example second function 708.

The first axis 702 is the y-axis of the example graph 700. In the illustrated example of FIG. 7, the first axis 702 corresponds to the number of mathematical operations required to determine estimate the number of unique audience members represented in a data set. In some examples, the number of mathematical operations corresponds to the memory and/or processing burdening corresponding to a given operation. Accordingly, a lower value (e.g., a lower location, etc.) on the first axis 702 correspond to a reduction of memory/or processing burden of the function.

The second axis 704 is the x-axis of the example graph 700. In the illustrated example of FIG. 8, the second axis 704 corresponds to the number of unique elements (e.g., the number of bins, etc.) in the data to be deduplicated. Accordingly, a higher value (e.g., a location further to the left, etc.) on the second axis 704 corresponds to an increase in the number of elements to be deduplicated.

The example first function 706 correspond to traditional means for deduplicating sets of data. For example, the first function 706 can correspond to the HashSet method. In other examples, the first function 706 can correspond to any other suitable method. In the illustrated example of FIG. 7, as the number of unique elements in the sets increases, the number of operations required for the first function 706 deduplicates the data increases linearly. The example second function 708 corresponds to the example disclosed above in conjunction with FIGS. 1-6. In the illustrated example of FIG. 7, as the number of unique elements in the sets increases, the number of operations required for the first function 706 deduplicates the data increases logarithmically. Accordingly, the second function 708 dramatically reduces the memory and/or processing requirements to deduplicate data when compared to the first function 706.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
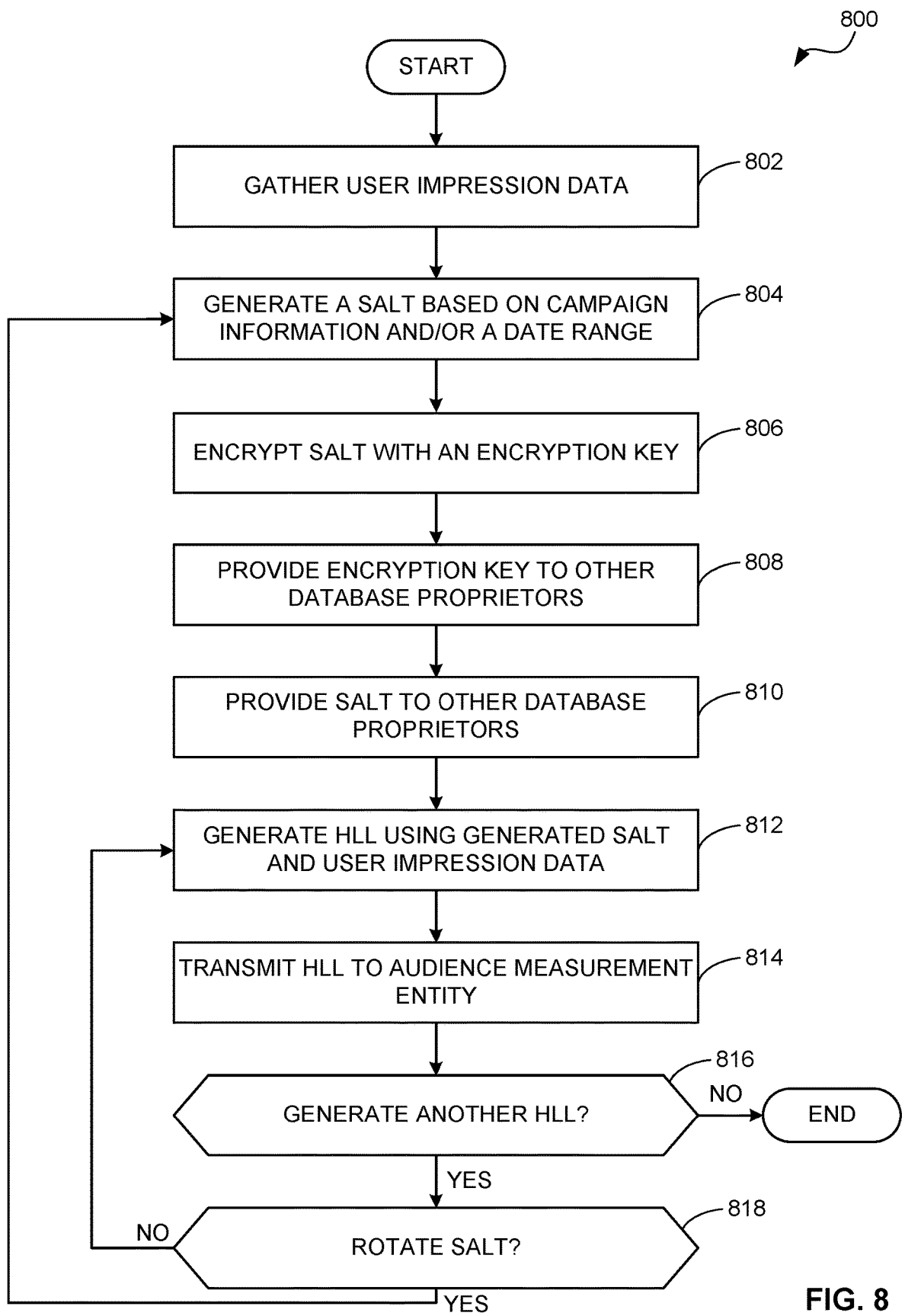
FIG. 8 is a flowchart representative of machine-readable instructions which may be executed to implement the example DP audience metrics generator(s) of the first database proprietor and/or the second database proprietor of FIGS. 1 and 2.

A flowchart representative of example hardware logic, machine readable instructions, hardware implemented state machines, and/or any combination thereof for implementing the example first database proprietor 106A of FIGS. 1-2 is shown in FIG. 8. The machine-readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 8, many other methods of implementing the example first database proprietor 106A may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

FIG. 8 includes a process 800 that begins at block 802. At block 802, the impression detector 202A gathers user impression data. For example, the impression detector 202A can detect an impression request (e.g., the impression request 122A, etc.) created by a client device (e.g., one of the client devices 108, etc.) in response to the client device accessing media. In some examples, the impression identifier 112A can include any information usable to identify the media and/or the requesting client device. In some examples, the impression identifier 122A can include relevant PII associated with a user of the client device. In some examples, the impression identifier 122A can include information the first database proprietor 106A can use to link PII information to the gathered impression, At block 804, the first salt generator 206A generates a salt based on campaign information and/or a date range. For example, the first salt generator 206A can use a campaign attribute (e.g., a date range associated with the campaign, etc.) to generate a salt for use in creating the HLL data. In other examples, the first salt generator 206A can use any other information suitable data (e.g., any arbitrary data, etc.) for use in generating the salt.

At block 806, the first salt encryptor 210A encrypts the salt with an encryption key. The first salt encryptor 210A encrypts the generate salt using an encryption key associated with the first database proprietor 106A and/or the second database proprietor 106B. In some examples, the encryption key is provided by a third party (e.g., the AME 102, etc.) to encrypted the salt key. In some examples, the execution of block 806 can be omitted. In such examples, the generated salt is not encrypted.

At block 808, the first database proprietor interface 214A provides the encryption key to other database proprietor(s). From example, the first salt encryptor 210A can use the first database proprietor interface 214A to transmit the encryption key to the second database proprietor 106B. In some examples, the execution of block 808 can be omitted. For example, the encryption key can be a public key. In other examples, the encryption key can be transmitted by a third party (e.g., the AME 102, etc.) to the other database proprietor 102B.

At block 810, the first database proprietor interface 214A provides salt to other database proprietors. From example, the first salt encryptor 210A and/or the first salt generator 206A can use the first database proprietor interface 214A to transmit the generated salt to the second database proprietor 106B. In some examples, the generated salt is not transmitted to the AME 102 to ensure the privacy of the PII information associated with the gathered impressions.

At block 812, the first HLL generator 208A generates an HLL using generated salt and user impression data. For example, the first HLL generator 208A can use the salt generated by the first salt generator 206A and a PII associated with each of the detected impression. For example, the first HLL generator 208A can concatenate a PII (e.g., an email address) with the salt, hash the concatenated data, and add the resulting hash value to the HLL data 132A (e.g., a vector, a matrix, etc.). In some examples, the first HLL generator 208A can generate the HLL data 132A based on each impression stored in the impression and PII database 204A and associated with a particular time period (e.g., a day, a week, etc.). In such examples, the HLL data 132A is generated using the same salt. An example of the function of the first HLL generator 208A is described above in conjunction with FIGS. 4-6.

At block 814, the first AME interface 212A transmits HLL to the audience measurement entity 102. For example, the first HLL generator 208A can cause the first AME interface 212A to transmit the generated HLL data 132A to the AME 102. In some examples, the first AME interface 212A does not transmit the generated salt to the AME 102. In such examples, the AME 102 is unable to determine the PII information encoded in the HLL data 132A At block 816, the first HLL generator 208A determines if another HLL is to be generated. For example, the first HLL generator 208A can determine if there is additional impression data stored in the impression and PII database 204A. In some examples, the first HLL generator 208A can operate periodically (e.g., every hour, every day, etc.). If the first HLL generator 208A decides another HLL is too be generated, the process 800 advances to block 818. If the first HLL generator 208A decides another HLL is not be generated, the process 800 ends.

At block 818, the first salt generator 206A decides if the salt is to be rotated. For example, the first salt generator 206A can generated a new salt periodically (e.g., every day, etc.). In other examples, the first salt generator 206A can generate a new salt at the beginning of a new advertisement campaign. In some examples, the first salt generator 206A after receiving a notification from the AME 102. If the first salt generator 206A decides the salt is to be rotated, the process 800 returns to block 804. If the first salt generator 206A decides the salt is not to be rotated, the process 800 returns to block 812.

Figure 9:
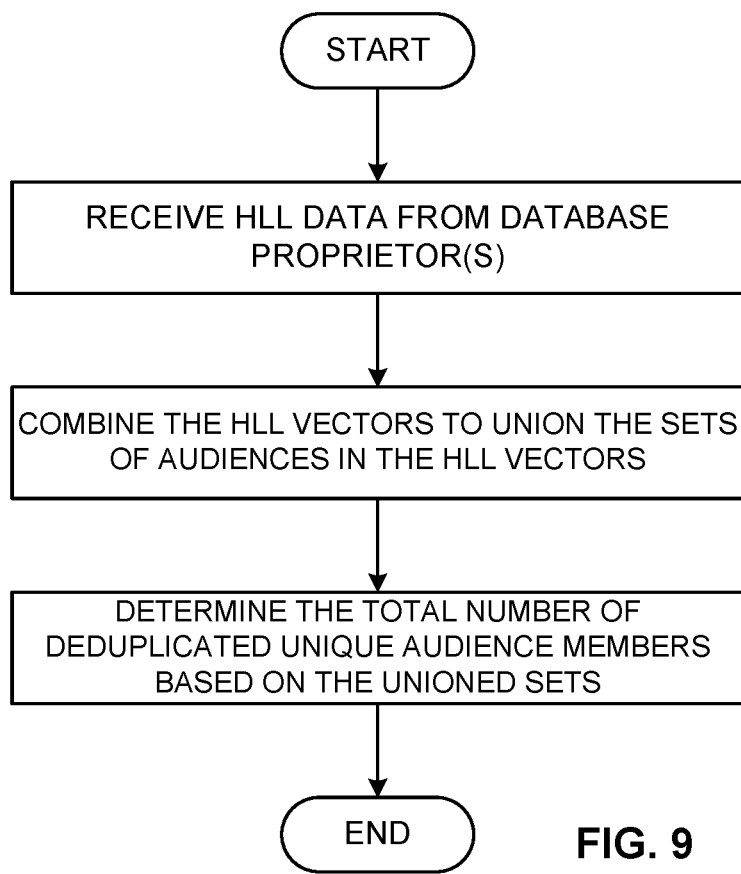
FIG. 9 is a flowchart representative of machine-readable instructions which may be executed to implement the example audience metrics generator of FIGS. 1 and 3.

A flowchart representative of example hardware logic, machine readable instructions, hardware implemented state machines, and/or any combination thereof for implementing the example first audience entity of FIGS. 1 and 3 is shown in FIG. 9. The machine-readable instructions may be one or more executable programs or portion(s) of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 9, many other methods of implementing the example first database proprietor 106A may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 8 and 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 9 includes a process 900 that begins at block 902. At block 902, the database proprietor interface 302 receives HLL data 132A, 132B from the database proprietors 106A, 106B. For example, the database proprietor interface 302 can receive one or more hashed vectors containing hashed vectors. In some examples, the database proprietor interface 302 can request the HLL data 132A, 132B periodically from the database proprietors 106A, 106B. In other examples, the database proprietor interface 302 can receive the HLL data 132A, 132B from the database proprietors 106A, 106B as they HLL data 132A, 132B is generated, At block 904, the vector analyzer 304 combines the HLL vectors to union the sets of audiences in the HLL vectors. For example, the vector analyzer 304 can use the process described above in conjunction with FIGS. 4-6 to combine the received HLL data 132A, 132B. In other examples, the vector analyzer 304 can use any other suitable means to combine the received HLL vectors.

At block 906, audience determiner 306 determines the total number of deduplicated unique audience members based on the unionid sets. For example, the audience determiner 306 can use the process described in conjunction to determine the unique audience count 318. In other examples, the audience determiner 306 can use any other suitable means to determine the unique audience estimate 318. The process 900 then ends.

Figure 10:
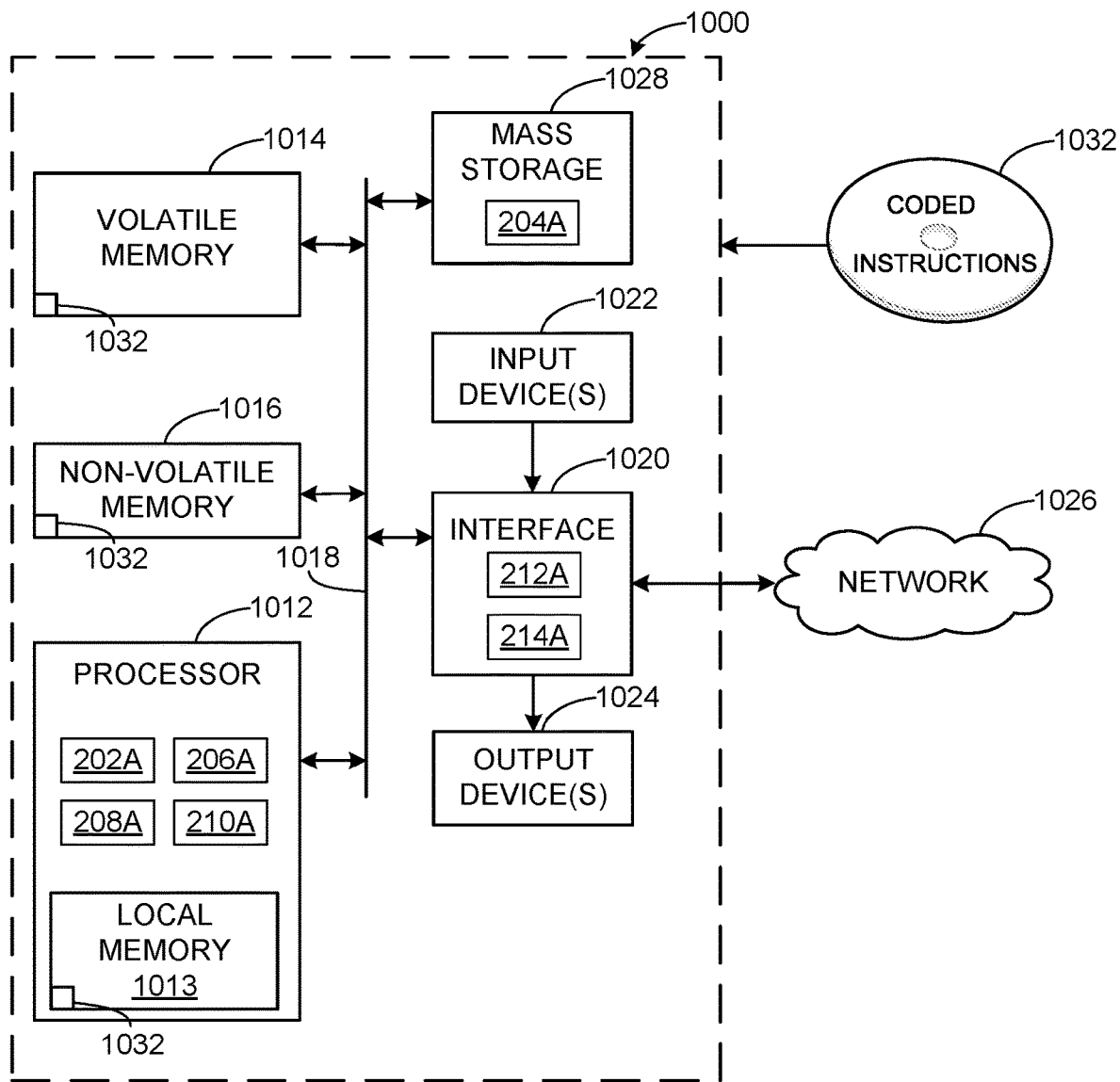
FIG. 10 is a block diagram of an example processing platform structured to execute the instructions of FIG. 8 to implement the example DP audience metrics generator(s) of the first database proprietor and/or the second database proprietor of FIGS. 1-2.

FIG. 10 is a block diagram of an example processor platform 1000 structured to execute the instructions of FIG. 8 to implement the example first database proprietor 106A and/or the second database proprietor 106B of FIGS. 1-2. The processor platform 1000 can be, for example, a server, a personal computer, a workstation, a self-learning machine (e.g., a neural network), or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example first impression detector 202A, the example first salt generator 206A, an example first HLL generator 208A, and the example first salt encryptor 210A.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface. In the illustrated example, the interface circuit 1020 implements the example first AME interface 212A, and the example first database proprietor interface 214A.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives. In the illustrated example, the mass storage device(s) implements the example first impression and PII database 204A.

Machine-executable instructions 1032 represented by the flowchart of FIG. 8 may be stored in the mass storage device 1028, in the volatile memory 1014, in the non-volatile memory 1016, and/or on a removable non-transitory computer readable storage medium such as a CD or DVD.

Figure 11:
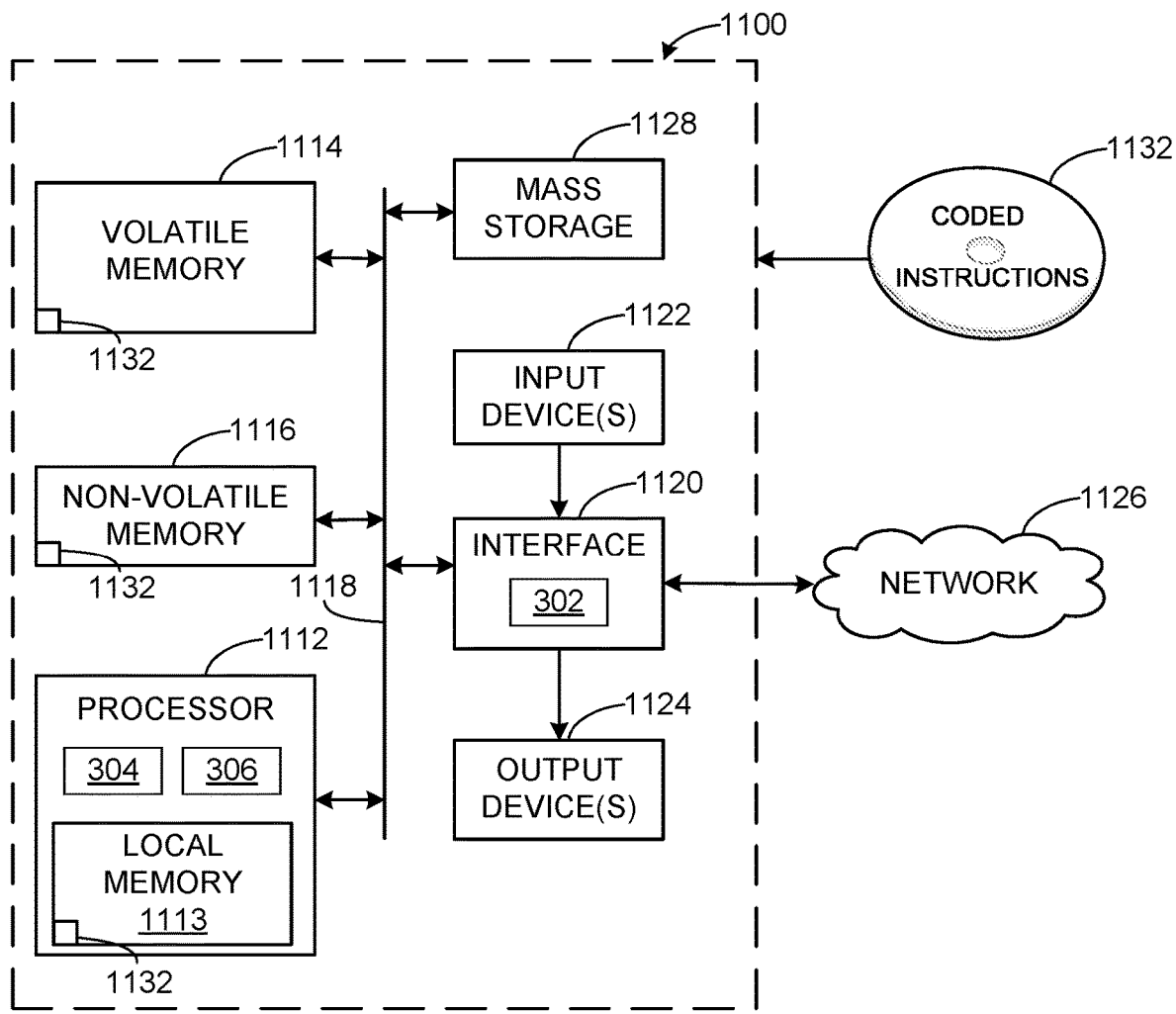
FIG. 11 is a block diagram of an example processing platform structured to execute the instructions of FIG. 9 to implement the example AME audience metrics generator of the audience measurement entity of FIGS. 1 and 3.

FIG. 11 is a block diagram of an example processor platform 1100 structured to execute the instructions of FIG. 9 to implement the example audience measurement entity 102 of FIGS. 1 and 3. The processor platform 1100 can be, for example, a server, a personal computer, a workstation, a self-learning machine (e.g., a neural network), or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example vector analyzer 304 and the example audience determiner 306.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc. In the illustrated example, the interface circuit 1120 implements the database proprietor interface 302.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

Machine-executable instructions 1132 represented by the flowchart of FIG. 9 may be stored in the mass storage device 1128, in the volatile memory 1114, in the non-volatile memory 1116, and/or on a removable non-transitory computer readable storage medium such as a CD or DVD.

Example methods, apparatus, systems, and articles of manufacture to generate measures of unique audiences for Internet-based media are disclosed herein. Further examples and combinations thereof include the following: Example 1 includes an apparatus comprising a salt generator to generate a shared salt at a first database proprietor, a database proprietor interface to the shared salt to a second database proprietor, a Hyperloglog (HLL) generator to generate a first hash vector at the first database proprietor based on the shared salt and first user impression data associated with media, the first hash vector to obfuscate first personally identifiable information of first subscribers of the first database proprietor, and an AME interface to send the first hash vector to a database containing a second hash vector, the second hash vector generated by the second database proprietor using second user impression data and the shared salt, the second hash vector to obfuscate second personally identifiable information of second subscribers of the second database proprietor, the first hash vector and the second hash vector to enable a third party to a deduplicate audience size corresponding to the first user impression data and the second user impression data.

Example 2 includes the apparatus of example 1, wherein the media is an advertising campaign.

Example 3 includes the apparatus of example 1, wherein the salt generator generates the shared salt based on a first campaign attribute of the media, and further including the salt generator to determine a second advertising campaign attribute, the salt generator to determine a second shared salt based on the second advertising campaign attribute, and the database proprietor interface to send the second shared salt to the second database proprietor.

Example 4 includes the apparatus of example 1, further including a salt encryptor to encrypt the shared salt with an encryption key, the encryption key available to the first and second database proprietors.

Example 5 includes the apparatus of example 1, wherein the third party is an audience measurement entity.

Example 6 includes the apparatus of example 1, wherein the AME interface sending the first hash vector to the database includes sending the first hash vector to a cloud server.

Example 7 includes the apparatus of example 1, wherein the first hash vector is a first hyperloglog vector, the second hash vector is a second hyperloglog vector, and the third party unions the first hyperloglog vector and the second hyperloglog vector to determine the deduplicated audience size.

Example 8 includes a method comprising generating a shared salt at a first database proprietor, sending the shared salt to a second database proprietor, generating a first hash vector at the first database proprietor based on the shared salt and first user impression data associated with media, the first hash vector to obfuscate first personally identifiable information of first subscribers of the first database proprietor, and sending the first hash vector to a database containing a second hash vector, the second hash vector generated by the second database proprietor using second user impression data and the shared salt, the second hash vector to obfuscate second personally identifiable information of second subscribers of the second database proprietor, the first hash vector and the second hash vector to enable a third party to a deduplicate audience size corresponding to the first user impression data and the second user impression data.

Example 9 includes the method of example 8, wherein the media is an advertising campaign.

Example 10 includes the method of example 8, wherein the shared salt is based or a first attribute of the media, and further including determining a second advertising campaign attribute, determining a second shared salt based on the second advertising campaign attribute, and sending the second shared salt to the second database proprietor.

Example 11 includes the method of example 8, further including encrypting the shared salt with an encryption key, the encryption key available to the first and second database proprietors.

Example 12 includes the method of example 8, wherein the third party is an audience measurement entity.

Example 13 includes the method of example 8, wherein sending the first hash vector to the database includes sending the first hash vector to a cloud server.

Example 14 includes the method of example 8, wherein the first hash vector is a first hyperloglog vector, the second hash vector is a second hyperloglog vector, and the third party unions the first hyperloglog vector and the second hyperloglog vector to determine the deduplicated audience size.

Example 15 includes a non-transitory computer readable storage medium comprising instructions that, when executed, cause a processor to at least generate a shared salt at a first database proprietor, send the shared salt to a second database proprietor, generate a first hash vector at the first database proprietor based on the shared salt and first user impression data associated with media, the first hash vector to obfuscate first personally identifiable information of first subscribers of the first database proprietor, and send the first hash vector to a database containing a second hash vector, the second hash vector generated by the second database proprietor using second user impression data and the shared salt, the second hash vector to obfuscate second personally identifiable information of second subscribers of the second database proprietor, the first hash vector and the second hash vector to enable a third party to a deduplicate audience size corresponding to the first user impression data and the second user impression data.

Example 16 includes the non-transitory computer readable storage medium of example 15, wherein the media is an advertising campaign.

Example 17 includes the non-transitory computer readable storage medium of example 15, wherein the shared salt is based or a first attribute of the media, and the instructions further cause the processor to determine a second advertising campaign attribute, determine a second shared salt based on the second advertising campaign attribute, and send the second shared salt to the second database proprietor.

Example 18 includes the non-transitory computer readable storage medium of example 15, wherein the instructions further cause the processor to encrypt the shared salt with an encryption key, the encryption key available to the first and second database proprietors.

Example 19 includes the non-transitory computer readable storage medium of example 15, wherein the third party is an audience measurement entity.

Example 20 includes the non-transitory computer readable storage medium of example 15, wherein the first hash vector is a first hyperloglog vector, the second hash vector is a second hyperloglog vector, and the third party unions the first hyperloglog vector and the second hyperloglog vector to determine the deduplicated audience size.

From the foregoing, it will be appreciated that example methods, apparatus and articles of manufacture have been disclosed that determine a unique audience for internet-based media. The disclosed methods, apparatus and articles of manufacture improve the efficiency of using a computing device by reducing the amount of processing and memory required to determine the unique audience based on detected impressions. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

The invention claimed is:

1. An apparatus comprising:
   at least one memory;
   programmable circuitry; and
   machine readable instructions in the at least one memory, the machine readable instructions to cause the programmable circuitry to:
     generate a shared salt at a first database proprietor;
     cause transmission of the shared salt to a second database proprietor;
     generate a first hash vector at the first database proprietor based on the shared salt and first impression data, the first impression data associated with media, the first hash vector to obfuscate first personally identifiable information of first subscribers of the first database proprietor; and
     cause transmission of the first hash vector to a database containing a second hash vector, the second hash vector generated by the second database proprietor using second impression data and the shared salt, the second hash vector to obfuscate second personally identifiable information of second subscribers of the second database proprietor, the first hash vector and the second hash vector to enable a third party to generate a deduplicated audience size corresponding to the first impression data and the second impression data.

2. The apparatus as defined in claim 1, wherein the media is an advertisement.

3. The apparatus as defined in claim 1, wherein the shared salt is based on a first attribute of the media, and the programmable circuitry is to:
determine an advertising campaign attribute;
determine a second shared salt based on the advertising campaign attribute; and send the second shared salt to the second database proprietor.

4. The apparatus as defined in claim 1, wherein the programmable circuitry is to encrypt the shared salt with an encryption key, the encryption key available to the first and second database proprietors.

5. The apparatus as defined in claim 1, wherein the third party is an audience measurement entity.

6. The apparatus as defined in claim 1, wherein the first hash vector is a first hyperloglog vector, the second hash vector is a second hyperloglog vector, and the third party is to analyze a union the first hyperloglog vector and the second hyperloglog vector to generate the deduplicated audience size.

7. The apparatus as defined in claim 1, wherein the programmable circuitry is to replace the shared salt based on third impression data corresponding to second media.

8. The apparatus as defined in claim 7, wherein the programmable circuitry is to replace the shared salt with a second shared salt.

9. The apparatus as defined in claim 1, wherein at least one of the first personally identifiable information or the second personally identifiable information include email addresses.

10. An apparatus to obfuscate personally identifiable information based on hash vectors, the apparatus comprising:
means for generating a shared salt at a first database proprietor;
means for sending the shared salt to a second database proprietor;
means for generating a first hash vector at the first database proprietor based on the shared salt and first impression data, the first impression data corresponding to media, the first hash vector to obfuscate first personally identifiable information of first subscribers of the first database proprietor; and
means for sending the first hash vector to a database containing a second hash vector, the second hash vector generated by the second database proprietor using second impression data and the shared salt, the second hash vector to obfuscate second personally identifiable information of second subscribers of the second database proprietor, the first hash vector and the second hash vector to enable a third party to determine a deduplicated audience size corresponding to the first impression data and the second impression data.

11. The apparatus of claim 10, wherein the media is an advertisement.

12. The apparatus of claim 10, wherein the shared salt is based on a first attribute of the media, the apparatus further including:
means for determining an advertising campaign attribute;
means for determining a second shared salt based on the advertising campaign attribute; and
means for sending the second shared salt to the second database proprietor.

13. The apparatus of claim 10, further including means for encrypting the shared salt with an encryption key, the encryption key available to the first and second database proprietors.

14. The apparatus of claim 10, wherein the third party is an audience measurement entity.

15. The apparatus of claim 10, wherein the first hash vector is a first hyperloglog vector, the second hash vector is a second hyperloglog vector, and the third party is to generate a union the first hyperloglog vector and the second hyperloglog vector to determine the deduplicated audience size.

16. The apparatus of claim 10, further including means for replacing the shared salt based on third impression data corresponding to second media.

17. The apparatus of claim 16, wherein the means for replacing is to replace the shared salt with a second shared salt.

18. An apparatus comprising:
at least one memory;
programmable circuitry; and
machine readable instructions in the at least one memory to cause the programmable circuitry to:
generate, at a first database proprietor, a first shared salt based on media accessed at client devices;
encrypt the first shared salt with an encryption key;
obtain impression data and personally identifiable data of subscribers corresponding to the accesses to the media;
append the first shared salt to the personally identifiable data and the impression data;
generate first hyperloglog data using the first shared salt and the personally identifiable data, the first hyperloglog data to obfuscate the personally identifiable data of subscribers of the first database proprietor; and
cause transmission of the first hyperloglog to at least one of an audience measurement entity or a second database proprietor.

19. The apparatus of claim 18, wherein the programmable circuitry is to provide the encryption key and the first shared salt to the second database proprietor.

20. The apparatus of claim 18, wherein the programmable circuitry is to replace the first shared salt with a second shared salt.

* * * * *